United States Patent [19]

Freeman

[11] Patent Number: 4,672,679

[45] Date of Patent: Jun. 9, 1987

[54] CONTEXT REDUNDANCY TEXT COMPRESSION

[75] Inventor: Ernest A. Freeman, Oakland, Calif.

[73] Assignee: Wang Laboratories, Inc., Lowell, Mass.

[21] Appl. No.: 523,739

[22] Filed: Aug. 16, 1983

[51] Int. Cl.[4] .............................................. G06K 9/72
[52] U.S. Cl. .......................................... 382/40; 382/56
[58] Field of Search .................... 382/40, 56; 358/260, 358/263

[56] References Cited

U.S. PATENT DOCUMENTS

| | | | |
|---|---|---|---|
| 3,533,069 | 10/1970 | Garry | 382/40 |
| 3,717,851 | 2/1973 | Cocke et al. | 364/900 |
| 4,058,795 | 11/1977 | Balm | 382/40 |
| 4,383,307 | 5/1983 | Gibson | 382/40 |

FOREIGN PATENT DOCUMENTS 0083393 7/1983 European Pat. Off. .

OTHER PUBLICATIONS

Parrott, "Text Compression Using Spelling Dictionary", *IBM Tech. Dis. Bulletin*, vol. 25, No. 11B, 4/83, pp. 6249–6250.

Primary Examiner—Leo H. Boudreau
Attorney, Agent, or Firm—Michael H. Shanahan; Gary D. Clapp

[57] ABSTRACT

A generalized method and apparatus for compression and decompression of textual information. Compression is performed by reading in succession each character and an associated context of a text, selecting for each character and associated context a corresponding code character, and providing the resulting code characters as the compressed form of the text. Decompression is a symmetric, inverse operation wherein the contexts associated with the code characters are read from a known decompressed portion of text. The context of a character is a group of text characters associated with a text character and containing a fixed number of characters. Text and code characters and contexts are related through a table containing a relative alphabet for the contexts of the language of the text. Each relative alphabet contains the text characters occurring in association with a corresponding context, and text characters within a given relative alphabet are identified by code characters assigned from set of code characters shared by the relative alphabets.

26 Claims, 4 Drawing Figures

CONTEXT REDUNDANCY TEXT COMPRESSION

BACKGROUND OF THE INVENTION

1. Field of the Invention

The present invention relates to data and word processing and communications systems and, more particularly, to a method and apparatus for compressing textual information for storage or transmission. In this context, textual information is defined as any information which is represented by a structured order of symbols or characters selected from a defined set, or alphabet, of symbols or characters. Common examples of textual information may include documents such as letters, reports and manuscripts written, for example, in English, German or French, business and accounting records, scientific data, and graphic displays comprised of arrangements of graphic symbols.

2. Prior Art

A recurring problem in data processing and communications systems is that of storing, processing and communicating ever increasing volumes of information. The information handling requirements of such systems increases at least as rapidly, and often more rapidly, than does the capacity of available memories and data links. In addition, there are often physical or economic limits upon the memory or communications capability that may be provided with or added to a particular system. As a result, other methods than increasing memory or data link capacity have been developed to enable systems to handle increased volumes of information. One such method is referred to as data compression, wherein information communicated into a system by a user of the system is transformed by the system into a more compact, or reduced, form for storage or transmission. The information may subsequently be transformed, or decompressed, from its reduced form to its original form to be communicated to the user.

Typically, the language in which information is communicated between a system and a user of the system contains a significant degree of redundancy. That is, the language in which information is expressed contains more information than is required to completely and accurately represent the actual information. A common example occurs in word processing wherein information, that is, text, is communicated between the user and system in the English language, including punctuation and format characters such as periods, commas, spaces, tabs and line returns. Text compression is possible because of such redundancy and essentially transforms a user language text into a more compact form by deleting the redundant information from the user language version of the text.

Text compression methods of the prior art have been based upon distributional redundancy, that is, the non-linearity in frequency of use or occurrence of certain characters, character combinations, and words in particular user languages. For example, in the English language the characters 'e' and 'space' occur more frequently than 'y' or 'z', and certain letter pairs, or digraphs, such as 'th' and 'es', and certain words, such as 'the', 'of', and 'and', occur frequently.

Prior art schemes have used this distributional redundancy to achieve compression by assigning variable length code words, or characters, to represent the frequently appearing characters, character combinations and words in particular languages. That is, the most frequently appearing character, character combinations and words are assigned short code characters. Less common character combinations and words are, depending upon frequency of occurrence, assigned longer code characters or are 'spelled out' as sequences of the more frequently occurring characters, character combinations and words.

The actual compression and decompression of text in data and word processing and communications systems is generally implemented through the use of 'look-up' tables relating the frequently occurring characters, character combinations and words to the corresponding assigned code characters. The compression and decompression tables are generated separately from the actual compression/decompression operation and typically require a thorough, detailed linguistic analysis of very large volumes of text in the user language. It should be noted that while it is possible to assign a code character to each possible word and character in a particular language, the resulting code characters and tables become so large as to require more memory space than would be saved by text compression.

Distributional redundancy methods of text compression are very dependent upon the linguistic characteristics of the individual languages in which the original texts are created, particularly with regard to larger linguistic units, such as character combinations and words. For example, English, German, French, Russian, Italian and the Scandanavian languages all have distinctly different linguistic characteristics, require different methods of analysis, and result in very different compression and decompression tables. As such, the compression schemes of the prior art have required a detailed linguistic analysis of of very large volumes of text in each separate user language in order to generate compression/decompression tables.

Because of the linguistic dependency of distributional redundancy methods, in particular with regard to the larger linguistic units, it is difficult to develope a completely general purpose method for analyzing distributional redundancy for a broad range of languages. Moreover, and for the same reasons, the compression/decompression tables for a particular language may depend upon the particular 'dialect' of text to be operated upon; for example, the linguistic characteristics for business, scientific and literary text may differ sufficiently to require separate tables for each application.

Further, because such methods use linguistic units and code words of differing sizes, compression/decompression requires relatively sophisticated programs with complex parsing capabilities and corresponding increases in processing capabilities and times and program memory space. For the same reason, the compression and decompression operations may not be symmetric, that is, may require separate tables and the execution of different routines with, again, increased processing and memory requirements. Finally, and for the same reasons, such methods are not suitable for continuous, in-line text processing or communication as the text must be processed as a series of small 'batch' operations, where the size of the batches are determined by the sizes of the linguistic units and code words.

OBJECTS OF THE INVENTION

It is an object of the present invention of provide an improved method and apparatus for text compression.

It is a further object of the present invention to provide a general text compression method and apparatus suitable for use with a wide range of languages.

It is yet a further object of the present invention to provide a text compression method and apparatus which is relatively independent of the linguistic characteristics of languages.

It is a still further object of the present invention to provide a text compression method and apparatus which is suitable for use with a wide range of types of text within a particular language.

It is another object of the present invention to provide a text compression method and apparatus which is symmetric in compression and decompression.

It is yet another object of the present invention to provide a text compression method and apparatus with improved speed of compression and decompression.

SUMMARY OF THE INVENTION

The text compression method and apparatus of the present invention operates upon the basis of context redundancy, that is, the nonuniform distribution of the contexts in which individual characters occur in texts, or, equivalently, the nonuniform distribution of occurrence of characters in a given set of contexts. Contexts, as defined herein, comprise uniform sized groups of characters preceding or following the individual characters comprising a text.

The method and apparatus described herein operates with abstract groupings and relationships between text characters and is not based upon any form of linguistic analysis nor upon any form of linguistic characteristic or element of any language. The method and apparatus is thereby general and is equally applicable for any language or 'dialect' of a language.

The method and apparatus operates with uniform sized groups of text and code characters and is thereby less complex and requires less processing time and capability than do other methods and is thereby faster in execution. The method is symmetric in execution, requires only a single, combined compression/decompression table, and is suitable for on-line, continuous processes.

Part of the information defining the relationships between code and text characters resides in the contexts, that is, in the text itself, in both its compressed and noncompressed forms. Because of this, fewer unique code characters, and thus shorter code characters, are required to unambiguously represent compressed text. The resulting compressed texts may thereby be represented by fewer bits of information.

Other objects, advantages and features of the present invention will be understood by those of ordinary skill in the art after referring to the following detailed description of a preferred embodiment and drawings, wherein:

DESCRIPTION OF A PREFERRED EMBODIMENT

The following description will first briefly present the general structure and operation of the hardware and software of an computer system capable of performing data and word processing and communications operations and incorporating the present invention. The structure and operation of such a system will be well understood, as presented herein, by one of ordinary skill in the art and further details of the structure and operation of such a system are presented in U.S. patent application Ser. No. 440,668, filed Nov. 10, 1982 and incorporated herein by reference. Having presented a context, that is, apparatus, in which to practice the method of the present invention, the context redundancy text compression method of the present invention will then be described in detail.

1. Computer System Structure and Operation

Figure 1:
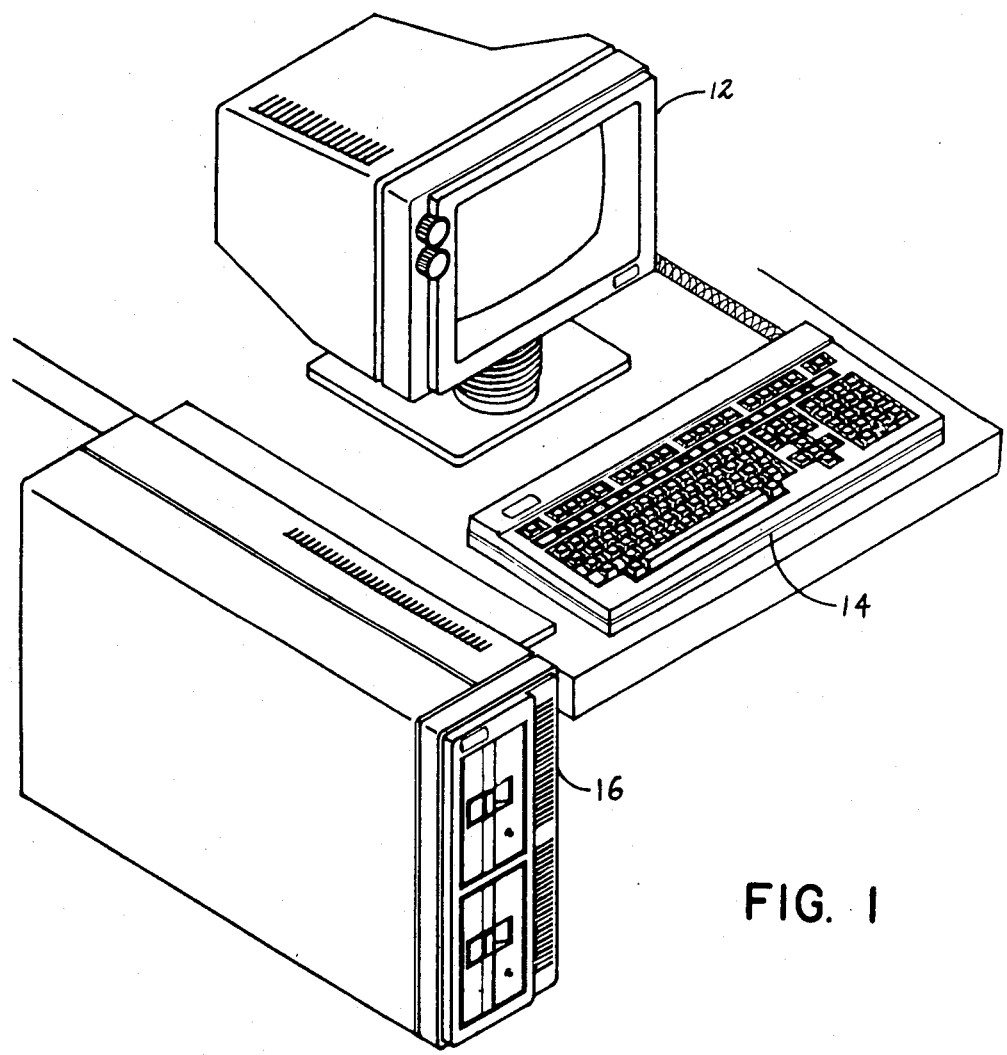
FIG. 1 is an isometric view of a computer system incorporating the present invention.

Referring to FIG. 1, an isometric view of the computer system is shown. System 10 includes a Display 12, a Keyboard 14 and a Central Processing Unit (CPU) 16. Display 12 and Keyboard 14 are the primary means by which information, for example, text, is communicated between the system and a user. CPU 16, which is connected to Display 12 and Keyboard 14 by cables which are not shown, includes a memory for storing programs and data and a general purpose arithmetic and logic unit (ALU). CPU 16 may further include disc drives for storing programs and data and interfaces to peripheral devices, such a printers, disc drives and telecommunications devices. System 10 may be comprised, for example, of a "Professional Computer" available from Wang Laboratories, Inc., Lowell, MA 01851.

A. Hardware Structure and Operation a. ALU and Busses

Figure 2A:
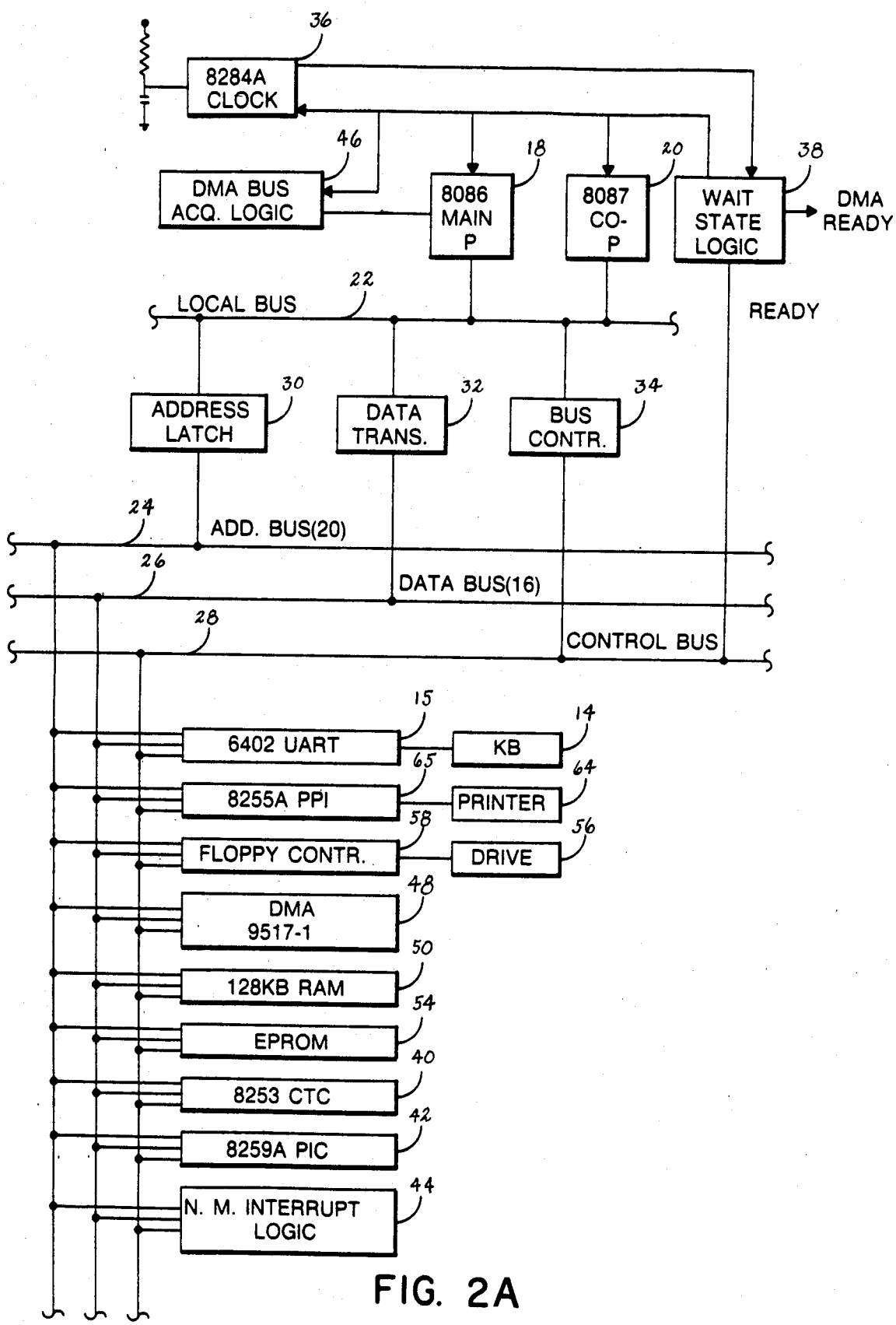
FIGS. 2 and 2A are a block diagram of the computer system of FIG. 1.
Figure 2B:
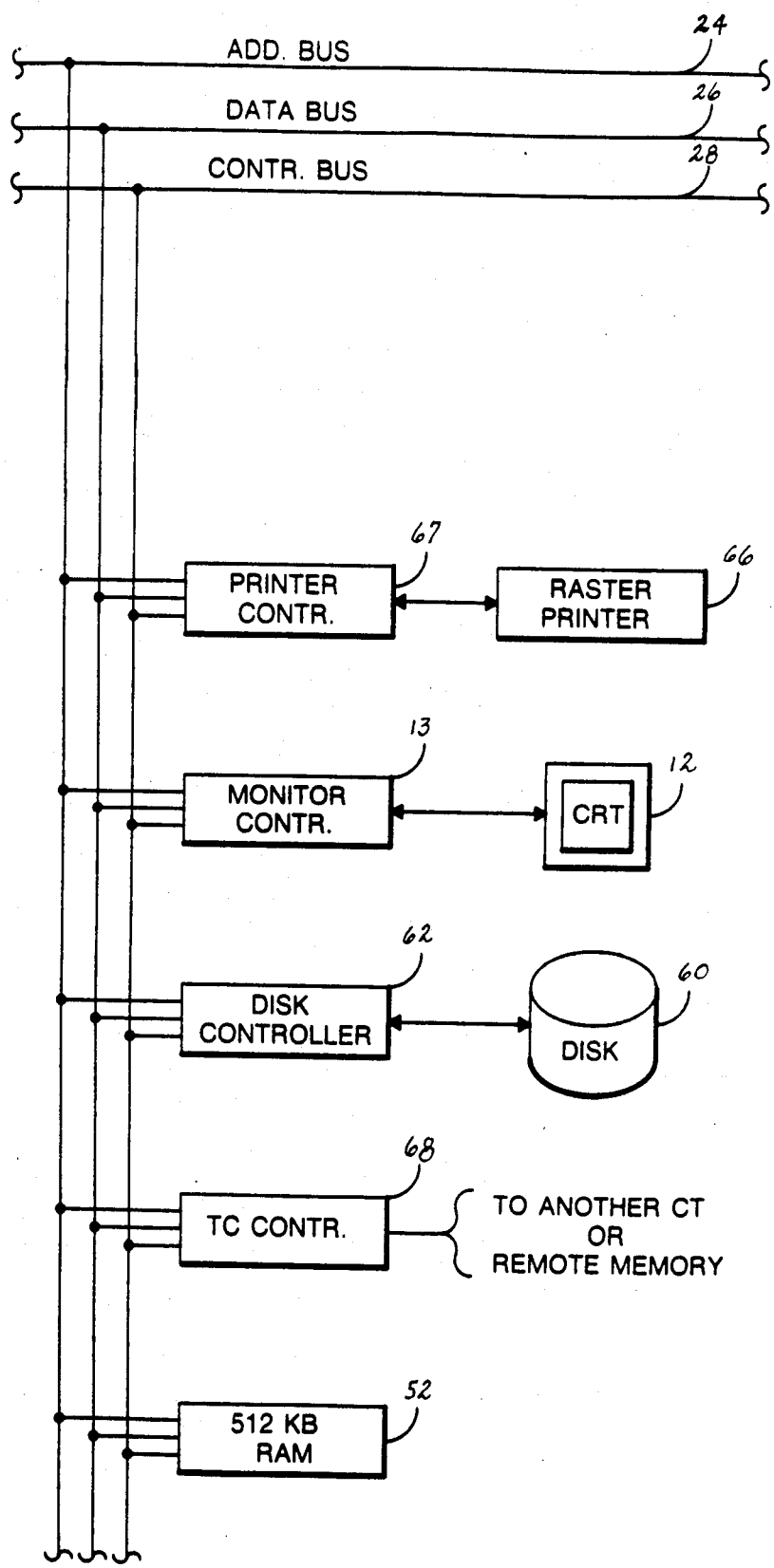

Referring to FIGS. 2 and 2A, a block diagram of System 10 is shown. System 10's ALU in CPU 16 is comprised of a Main Processor (Main P) 18 and a Co-Processor (CO-P) 20. Main P 18 and CO-P 20 may, for example, respectively be a 16 bit Intel 8086 ALU and an Intel 8087 numerics processor extension. Main P 18 and CO-P 20 perform all arithmetic and logic operations for CPU 16, including addressing, memory references, and control of Input/Output (I/O) operations.

Main P 18 and CO-P 20 communicate through Local Bus 22 and with the remainder of CPU 16, Display 12, Keyboard 14 and all peripheral devices through Address Bus 24, Data Bus 26 and Control Bus 28. The interface between Main P 18 and CO-P 20 and Busses 24, 26 and 28 is through Address latch 30, Data Transceiver 32 and Bus Control 34.

b. Internal Control Logic

Referring next to CPU 16's internal control logic, associated with Main P 18 and CO-P 20 are System Clock 36 and Wait State Logic 38. System Clock 36 is the source of all clock timing signals for CPU 16. Wait State Logic 38 essentially monitors the operations of CPU 16 and issues control signals, to System Clock 36 and to other elements of CPU 16 through Control Bus 28, to prevent conflicts in CPU 16 operations.

Other of CPU 16's control elements include Counter and Timer Chip (CTC) 40 and Programmable Interrupt Chip (PIC) 42. CTC 40 may, for example, be an Intel 8253 and PIC an Intel 8255A. Non-Maskable Interrupt Logic 44 operates in conjunction with PIC 42 to handle interrupt conditions which must be handled immediately, that is, which cannot be masked for later action. Such interrupt conditions include parity and I/O errors.

CPU 16 is capable of performing both mapped memory references and Direct Memory Access (DMA) operations between CPU 16's memories, described below, and, for example, System 10's peripheral devices. DMA operations are controlled by DMA Bus Acquisition Logic 46 and DMA Control (DMA) 48. DMA Acquisition Logic 46 monitors the operation of System 10, in particular memory and bus operations, and issues DMA grant signals on Control Bus 28 when DMA operations may be executed. DMA 48 detects requests for DMA operations, for example, from peripheral devices, informs DMA Bus Acquisition Logic 46 of the presence of such requests, and controls DMA operations when DMA Bus Acquisition Logic 46 grants access to CPU 16's busses.

c. Memory

CPU 16's primary internal memory is 128 KB Random Access Memory (RAM) 50, which is used to store operating system and applications programs and data, such as text, to be operated upon. The operating system program may, for example, be comprised of the commercially available Micro Soft Disk Operating System (MSDOS, a tradename) from Micro Soft Corporation and may include the Basic Input and Output System (BIOS). MSDOS essentially controls the executive internal operations of System 10 while BIOS comprises programs controlling the interface between System 10, Display 12 and Keyboard 14 and a wide range of peripheral devices.

Where necessary, the capacity of 128 KB RAM 50 may be augmented by the addition of 512 KB RAM 52. 512 KB RAM 52 is connected from Address Bus 24, Data Bus 26 and Control Bus 28 in parallel with 128 KB RAM 50 and operates in parallel with and effectively as a part of 128 KB RAM 50.

Erasable Programmable Read Only Memory (EPROM) 54 stores and provides programs used to load the operating system and application programs described above from diskettes in Disc Drive 56 and into 128 KB RAM 50 and 512 KB RAM 52.

As indicated in FIG. 2, Disc Drive 56 is connected from Address Bus 24, Data Bus 26 and Control Bus 28 and is controlled by Floppy Controller 58. In addition to storing and providing operating system and applications programs, Disc Drive 56 may be used as additional memory capacity augmenting 128 KB RAM 50 and 512 KB RAM 52 and may be used to store and load data, such as text to be operated upon. In this regard, Disc Drive 56 may be used as an I/O device, for example, to transfer text or data from one system to another on diskette.

The capacity of Disc Drive 56 may be augmented by the addition of Winchester Hard Disc Drive 60 and Disc Controller 62, which are connected from Address Bus 28, Address Bus 30 and Control Bus 32 in parallel with Disc Drive 56 and RAMs 50 and 52. Hard Disc Drive 56 may be used as an extension to RAMs 50 and 52, for storing programs and data to be operated upon.

d. I/O Devices

As previously described, Display 12 and Keyboard 14 are the primary I/O means for communication between System 10 and a user. Display 12 is a conventional CRT display connected to Address Bus 28, Data Bus 30 and Control Bus 32 through Monitor Control 13. Monitor Control 13 may, for example, be a Nippon Electric Corporation uPD 7220 Graphic Data Controller. Keyboard 14 is a conventional keyboard having an internal microprocessor, for example a Zilog Z80, for controlling keyboard operation and data/control communications between keyboard 14 and system Busses 28, 30 and 32 through Universal Asynchronous Receiver/Transmitter (UART) 15.

Other I/O devices include Printers 64 and 66. Printer 64 may, for example, be a conventional daisy wheel or dot matrix type printer. Printer 66 may, for example, be a thermographic printer for graphics printing, such as a Microplot 80 available from Gulton Industries, Inc. of East Greenwich, RI 02818.

Finally, communication between System 10 and other systems or devices is provided through Telecommunications Controller (TC) 68. TC 68 is a microprocessor controlled interface device, incorporating for example a Zilog Corporation Z80 microprocessor and serial I/O chip, for communication between system busses 28, 30 and 32 and communications modems or external devices, such as memories and displays.

It should be noted that the System 10 descibed above is exemplary and that the text compression method described further below may be implemented, for example, on a variety of system architectures. The method may, for example, be implemented on a processor based upon Zilog Z80, Motorola MC68000, Intel 8080, 8086 or 80186, or National Semiconductor NS16000 microprocessors, upon a minicomputer or mainframe computer, or upon a word processor or communications processor.

Having described the structure and operation of System 10's hardware, the software structure and operation of System 10 will be described next below.

B. Software Structure and Operation

Figure 3:
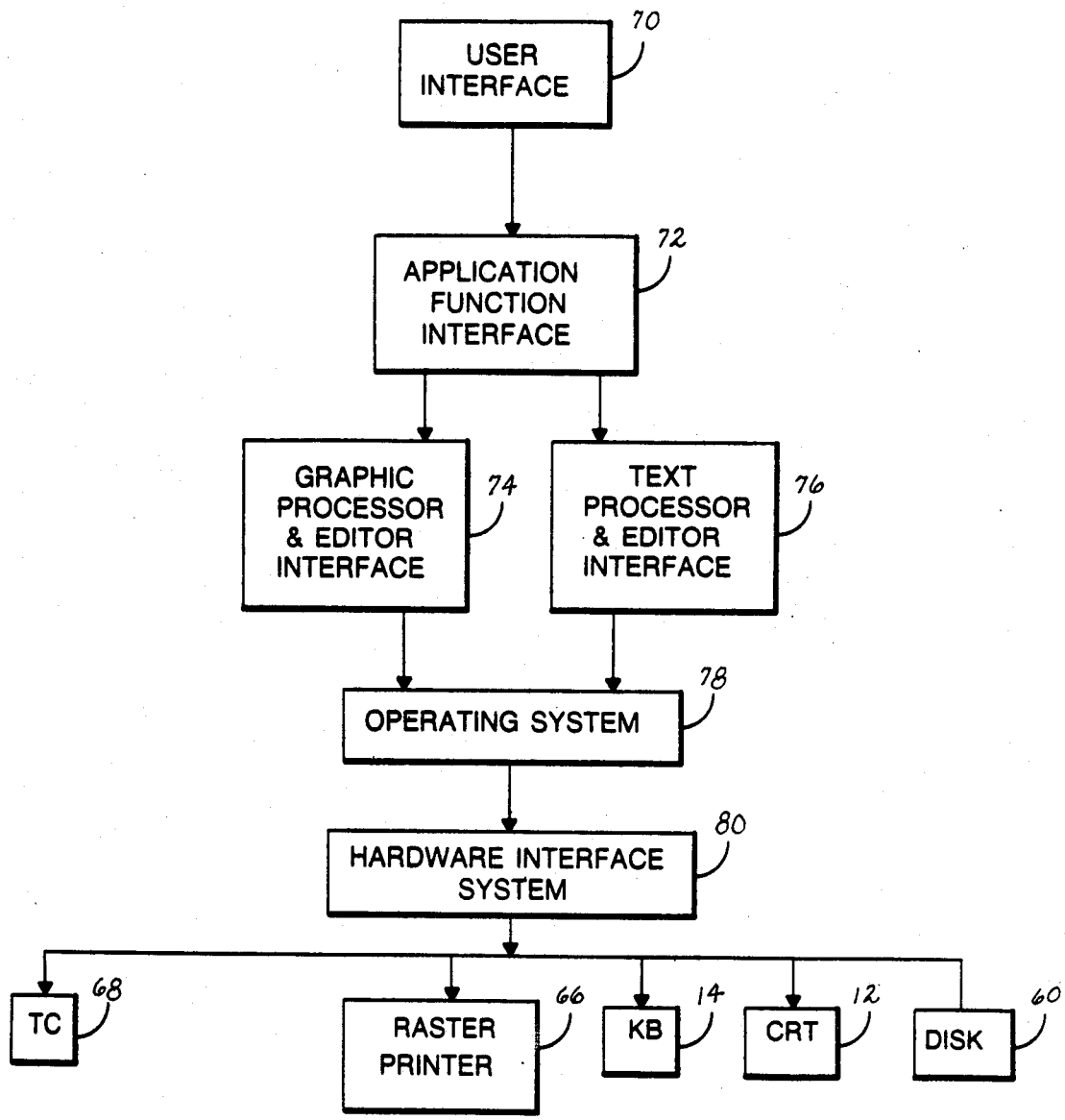
FIG. 3 is a diagrammic representation of the software structure of the computer system of FIGS. 1, 2 and 2A.

Referring to FIG. 3, a diagrammatic representation of System 10's software structure is shown. As indicated therein, the system software structure is a multilayered structure for transforming user actions into specific, detailed operations by the system hardware. The software structure includes elements for interfacing with the user at the upper layers and with the system hardware elements at the lower layers. The middle layers essentially transform user commands and requests into instructions directing the operations of the hardware.

Beginning at the user interface level, routines 70, 72, 74 and 76 comprises the system's application programs and determine and direct the specific applications operations performed by the system, for example, text or graphics editing or data processing.

User Interface Routines 70 includes all routines for interacting with the user by means of, for example, Display 12, Keyboard 14 and the system discs and printers. While User Interface Routines 70 are oriented towards the user, Application Function Interface Routines 72 interface between the user action operations as performed by User Interface Routines 70 and the software which performs the actual applications operations, such as text editing. Essentially, Application Function Interface Routines 72 transform the results of the user interface operations into instructions and commands for directing the applications operations specified by the user.

Applications Routines 74 and 76 are the actual applications programs, that is, the programs directing the system to perform, for example, text or graphics editing operations or data processing operations. Applications Routines 74 and 76 receive direction from Application Function Interface Routines 72 regarding what operations have been requested by the user and provide instructions to Operating System 78 as to what system operations must be performed to execute the requested operations.

As previously described, Operating System 78 may be comprised of MSDOS and includes all routines necessary for executive control of the system. Operating System 78 in turn interfaces with Hardware Interface System 80, which is comprised of BIOS, previously described. Essentially, Operating System 78 determines what detailed operations must be performed by the system to carry out the operations requested by the user and provides corresponding instructions to Hardware Interface System 80. Hardware Interface System 80 in turn responds by providing detailed commands to the various elements, previously described, comprising System 10's hardware structure.

As previously described, text compression allows text information to be stored within a system, for example, in memory or upon disc, or to be communicated between systems or devices in a more compact form. In the system described above, for example, text entered through the keyboard by a user, or loaded from a disc or through a communications link, could be compressed to be stored in RAM or upon disc or to be transmitted through a communications link. The text could subsequently be decompressed to be displayed to a user, for example, through the display or on a printer. Essentially, text compression and decompression may be performed whenever text information is communicated between a system element and a source or recipient using a language containing a significant degree of redundancy, for example, English.

As such, the text compression method described below would most probably be implemented in such a system as described above at the applications program level, corresponding to Applications Routines 74, 76 level of FIG. 3. The method could, however, also be implemented at the Application Function Interface 72 level, depending upon the degree of processing capability present in, for example, the display and keyboard. Alternately, the method could be implemented at the Operating System 78 or Hardware Interface System 80 level if the implementation was to be a basic feature of system operation. Depending upon the implementation, the compression/decompression tables described below may reside in RAM or in ROMs.

Having described above the context, or apparatus, in which the method of the present invention may be practiced, the context redundancy text compression method of the present invention will be described next below.

2. Context Redundancy Text Compression

As previously described, text compression depends upon the occurrence of information redundancy in the language of a text to be compressed. The prior art schemes described have relied upon distributional redundancy, that is, the non-uniformity in frequency of occurrence of certain characters, character combinations and words in the original text language.

The text compression method of the present invention is based upon context redundancy, that is, the statistically uneven occurrence of certain characters in sequential association, or context, with other characters. For example, the character 'u' most frequently follows the character 'q', 's' most frequently follows 'es' and a 'blank', or 'space', most frequently follows the characters 'est'.

In this method, 'context' is defined as the sequence of characters, taken in order, preceding or following a particular character and is referred to, respectively, as preceding context or following context. A context need not be located immediately adjacent to associated character, although adjacent contexts are used in the following examples. Preceding and following contexts are defined with reference to the sequence in which the characters of a particular language are normally written. In English, for example, preceding context are the characters appearing to the left of a particular characters and following context are those appearing to the right of the character. In other languages, for example, Hebrew or Chinese, preceding context may appear to the right of or above a particular character and following context to the left or below. In the example shown just above, 'q' is the left context of 'u', 'es' that of 's' and 'est' that of 'blank'.

While the text compression method described herein may be implemented with equal facility for both preceding and following context, preceding context is preferred as most suitable for 'on-line' compression and decompression. Following context compression and decompression requires 'batch' processing, that is, the storing and operating upon of sequential, overlapping groups of characters. Following context compression may, however, be advantageous in certain circumstances or for certain languages.

The 'order' of the context used in compressing and decompressing text is defined herein as the number of characters in the context and will preferably be constant in a particular implementation of the method. In the example shown above, 'q' is the first order context of 'u', 'es' the second order context of 's' and 'est' the third order context 'blank'.

To further define the above terms, let a particular language be expressed in an alphabet A comprised of the characters $x_i$ where $i = 1$ to u, that is, $x_1, x_2 \ldots x_{u-1}, x_u$. Assuming that the language is normally written left to right, if the sequence of characters $x_n x_{n-1} \ldots x_3 x_2 x_1 x_i$ appears in the text, then the sequence of characters $x_n x_{n-1} \ldots x_3 x_2 x_1$ is the $n^{th}$ order preceding, or left, context of $x_i$. It should be noted that the context of any character $x_i$ does not include the character $x_i$ itself.

The present method may be implemented for any value of order n and examples for the orders of $n = 1$ and $n = 2$ are presented below. Higher values of order may, however, be preferable.

For a given $x_i$ and a given order n, the set of all possible unique $n^{th}$ order preceding contexts is designated as $PC_n(x_i)$ and may contain up to $u^n$ members since there are u possible unique characters $x_i$ and n possible positions for each unique character. The set of all possible unique $u^{th}$ order preceding contexts for a given language is designated $PC_n$ and may contain up to $u^{n+1}$ members since $x_i$ can be any of u unique characters.

The text compression method of the present invention requires the use of 'look-up' table for compression and decompression. Although it appears from the above that such tables would be very large, in practice the tables are of acceptable size. As will be described further below, the present method and the construction of tables to implement the present method are not dependent upon the linguistic characteristics of the text languages. The linguistic characteristics do, however, effect the size of the tables because certain contexts are rare or do not appear in particular languages, thereby in practice limiting the sizes of the tables. For example 'wc' rarely appears as a prior context of 's' in English, and thus may not appear in an English language compression table, but may appear in, for example, a Polish language table. The compression method and the means by which the tables are generated are, however, the same in both English and Polish.

The compression/decompression tables of the present invention may be generated heuristically or by linguistic analysis. In the more preferred method, however, the tables are generated through context analysis of a suitable body of text, for example, dictionaries, thesauruses, manuscripts or documents.

The preferred method of table generation is a mechanical rather than linguistic analysis. First, for a given order of context n, the sample body of text is scanned character by character in sequence in the direction normally written and, for each character $x_i$, each occurrence of each prior context $PC_n(x_i)$ occurring is tabulated. The analysis will provide a table of frequency of occurrence of each $PC_n(x_i)$ for each $x_i$ and essentially maps contextual redundancy into a corresponding distributional redundancy of contexts for each character in the alphabet. This process may be readily accomplished by generating a tabular array using $x_i$ and $PC_n(x_i)$ as indices to the cells thereof and appropriately incrementing the cell contents as the characters $x_i$ and sample text are scanned.

Having generated the above described table, a final table is generated by sorting, for each $PC_n(x_i)$, each $x_i$ which appears in a particular context. That is, the final table will contain, for each particular context, all characters appearing in that context. The characters will generally be sorted, for each context, in order of frequency of occurrence. It should be noted that this final table may be generated directly, rather than as a derivation from the first table, by scanning successive contexts, shifting by one character at a time, and tabulating the occurring contexts and the characters appearing in each such context.

The final table then allows a 'relative alphabet' to be defined for each context, the relative alphabet for a particular context being comprised of all characters which occur in that context in order of frequency of occurrence. As will be described further below, this final table defines the relationships between all possible noncompressed text characters and compressed text code characters and is used for both compression and decompression of text.

Referring to Table 1, an illustrative example of a final compression/decompression table for a prior context of order n=2 is shown. The sample body of text used to generate Table 1 was comprised of general office correspondence. As Table 1 is intended solely for illustrative purposes, only a few of the occurring contexts are shown and for each context shown only the eight most frequently occurring text characters are shown.

TABLE 1

COMPRESSION/DECOMPRESSION TABLE

| CONTEXT | RANK-CODE CHARACTER | | | | | | | |
|---|---|---|---|---|---|---|---|---|
| | 1 | 2 | 3 | 4 | 5 | 6 | 7 | 8 |
| — | — | — | D | A | o | B | T | E | — |
| e_ | a | t | w | s | c | i | p | o |
| o_ | t | m | a | c | p | i | h | d |
| t_ | w | t | a | i | o | c | y | p |
| a_ | p | c | s | d | g | b | f | r |
| _e | x | n | d | a | l | v | s | q |

TABLE 1-continued

COMPRESSION/DECOMPRESSION TABLE

| CONTEXT | RANK-CODE CHARACTER | | | | | | | |
|---|---|---|---|---|---|---|---|---|
| | 1 | 2 | 3 | 4 | 5 | 6 | 7 | 8 |
| ee | t | d | m | k | n | l | — | , |
| te | r | d | — | n | m | c | g | l |
| ae | l | nul | nul | nul | nul | nul | nul | nul |
| ie | s | n | v | d | t | f | r | l |
| re | — | s | a | l | d | e | c | n |
| ne | — | s | r | w | d | x | t | e |
| se | _d | n | — | *M | r | s | , | l |
| le | — | a | x | s | c | *M | t | , |
| _o | f | u | n | r | t | p | w | v |
| eo | v | p | g | r | n | u | *M | nul |
| oo | k | n | d | m | p | t | l | — |
| to | — | r | m | *M | d | n | t | p |
| io | n | r | u | — | g | d | nul | nul |
| ro | d | m | n | v | f | c | p | g |
| no | w | t | n | — | u | i | , | l |
| so | — | o | m | r | n | f | l | t |
| lo | s | o | w | p | g | n | — | t |
| co | n | m | p | u | v | r | s | d |
| ot | h | — | a | i | e | , | — | *M |
| oa | c | s | r | d | t | nul | nul | nul |
| or | — | d | e | k | t | m | s | w |
| _t | h | o | e | i | a | w | r | u |
| ta | i | n | k | b | l | — | t | g |
| al | — | l | i | s | *M | m | t | , |
| l_ | b | a | s | t | p | f | c | E |
| _s | p | u | e | o | y | i | t | a |
| sa | u | l | t | y | n | m | b | g |
| es | s | — | t | a | e | , | . | i |

The various two character contexts are listed as the left, vertical index of Table 1 and the text characters appearing in each context are listed in the rows to the right of the corresponding contexts. For example, the text characters, or relative alphabet occurring for the context 'co' are, in order of frequency of occurrence, 'n', 'm', 'p', 'u', 'v', 'r', 's' and 'd'. It should be noted that the text character '_' is used to represent a space, or blank, '*M' represents an end-of-line character, and 'nul' represents an entry with a zero frequency count.

The rank numbers appearing as the horizontal index at the top of Table 1 comprise, for each context, the symbols, or code characters, used to represent the various text characters of each of the relative alphabets. Thus, the code character for text character 'm' in context 'co' is 2.

An examination of compression/decompression Table 1 shows that, for example, code character '2' also represents text character 'd' in contexts 'ee', 'te', 'se' and 'or' and text character 'r' in contexts 'to' and 'io'. Similarly, the code character '5' represents text character 'g' in contexts 'a_', 'io' and 'lo' and text character 'd' in contexts 're', 'ne' and 'to'. In further example, code characters '11' represents 'ss' if the prior context is 'ie' but represent 'th' if the prior context is 'o_'

It is apparent from the above that the same code character may represent different text characters and that a given text character may be represented by different code characters. That is, that there is not a unique, one to one relationship between code characters and text characters in themselves. The relationship between a code character and a text character depends upon the particular context in which the code and text character appear.

This illustrates property of context redundancy compression which will be further illustrated by example below, that a code character is not required to contain, in itself, the total amount of information required to uniquely define a particular text character. Part of the information defining the relationships between code and text characters resides in the text itself, that is, in the contexts. Because of this, fewer unique code characters, and thus shorter code characters, are required to unambiguously represent compressed text. The resulting compressed texts may thereby be represented by fewer bits of information. Thus the text itself, in both the compressed and noncompressed forms contains, in addition to the textural information, a part of the information required to transform between the compressed and noncompressed forms.

Because of the context dependent relationship between text and code characters, a prior context, for example, 'nuls' or 'blanks', is either assumed or imposed for the first n characters of text. This 'header context' provides a known context for compressing or decompressing the first character or characters of text, the following characters being compressed or decompressed in the context of the text itself.

To illustrate the use of the method and table of the present invention for compression and decompression of text, assume that the phrase 'total salt' appears in the text and that the prior context of the first 't' in 'total' is 'e_', as in (th)e_. The compression and subsequent decompression of this phrase is illustrated with Tables 2 and 3 presented below. Table 2 illustrates the compression process and Table 3 the decompression process.

TABLE 2

COMPRESSION OF 'total salt'

| Text Character | Prior Context | Code Character |
| --- | --- | --- |
| t | e_ | 2 |
| o | _t | 2 |
| t | to | 7 |
| a | ot | 3 |
| l | ta | 5 |
| — | al | 1 |
| s | l_ | 3 |
| a | _s | 8 |
| l | sa | 2 |
| t | al | 7 |

To compress the sample text, each text character and its associated context are read in turn and, in the preferred embodiment, in the sequence in which the text is normally written. In the present example, the reading will be from left to right. Since the present example uses a $2^{nd}$ order context, that is, n=2, the context for each character is comprised of the two characters immediately preceding the character. Having determined the two character prior context of a particular character, that context is then used as an index into the compression/decompression table to locate the relative alphabet for that context. The character read in association with the context is then located in the relative alphabet and the corresponding code character located in the rank index at the top of the table. This process is continued, a character at a time, until the compression operation is completed.

For example, the prior context of the first 't' in 'total' is 'e_'. 'e_' is used as an index into the table to locate the corresponding relative alphabet, which appears as the second relative alphabet from the top. The relative alphabet is then scanned to locate text character 't', the second entry from the left, and the corresponding code character is read from the top of the table as '2'. The next text character is the 'o' of 'total' and the context of 'o' is '_t', so that the code character for 'o' is again '2'. The third text character is the second 't' of 'total', the prior context of this 't' is 'to' and the code character is determined to be '7'.

This process continues to the end of the text and the compressed form of 'total salt' is found to be '2273513827'.

The reverse operation is performed, using the same compression/decompression table, to decompress compressed text. In this case, the 'text' to be read is the compressed text and the 'characters' read, one at a time and in sequence as written, are the code characters of the compressed text. The prior context of each code character is comprised of the preceding decoded characters of the restored text and are determined as the text is decompressed. The contexts so determined are again used as indices into the table to select the appropriate relative alphabets and the code characters are used as indices to determine the appropriate text characters within the selected relative alphabets. The known 'header context' used in the compression operation is again used as the beginning context in decompressing the first character or characters of the compressed text.

To illustrate the decompression operation using the same example as above, assume that the text to be decompressed is comprised of the code character sequence '2273513827' and that the preceding decompressed text has been determined to again be 'e_'. The decompression operation is then illustrated in Table 3 below.—

TABLE 3

DECOMPRESSION OF '2273513827'

| Prior Context | Code Character | Text Character |
| --- | --- | --- |
| e_ | 2 | t |
| _t | 2 | o |
| to | 7 | t |
| ot | 3 | a |
| ta | 5 | l |
| al | 1 | — |
| l_ | 3 | s |
| _s | 8 | a |
| sa | 2 | l |
| al | 7 | t |

Assuming that the preceding compressed text has been decompressed to the start of the sequence '2273513827', the prior context of the first '2' in the sequence is known from the previously decompressed portion of the text to be 'e_'. 'e_' is then used as an index into the table to determine the relative alphabet of the first '2' of the sequence and, for this character, is the second relative alphabet from the top of the table. The first '2' of the sequence is then used as an index into the table to determine that the corresponding text character of that relative alphabet is 't'. The prior context of the second '2' in the sequence is then known to be '_t' and, using '_t' and '2' as indices into the table, the text character corresponding to the second '2' is determined to be 'o'. The third code character is '7' with a now known prior context of 'to' and the text character can be determined to be 't', and so on.

Appendices A and B present further examples of an implementation of the compression/decompression method of the present invention. Appendices A and B contain, respectively, the driver and tables of a compressed version of the Random House Electronic Thesaurus as expressed in assembly language for the Zilog Z80 microprocessor and for an order n of 1.

In a yet further implementation, the compression/decompression described above may be used recursively, that is, the compressed texts may themselves be compressed using the same method as described above. Recursive compression requires the generation of compression/decompression tables in the same manner as described above, but using the compressed forms of the texts to determine and tabulate the context redundancy of the compressed textual material. The compression of text then becomes a two step process, a first step to compress the original text and a second step to compress the compressed text, as does the decompression process. The two step, or recursive, compression/decompression may, as in a single step process, be performed 'on-line', that is, as a continuous process.

To reiterate certain features of the above described method of text compression, the present method operates upon the basis of context redundancy, that is, the nonuniform distribution of the contexts in which individual characters occur. Contexts, as defined herein, comprise uniform sized groups of characters preceding or following the individual characters comprising a text.

Although the compression/decompression table used in the method are effected by the linguistic characteristics of particular languages, the method is not based upon any form of linguistic analysis nor upon any form of linguistic characteristic or element of any language. The method is thereby completely general and is equally applicable for any language or 'dialect' of a language.

Because the method operates with uniform sized groups of text and code characters, the method is less complex and requires less processing time and capability than do other methods and is thereby faster in execution. For the same reasons, the method is symmetric in execution, requires only a single compression/decompression table, and is suitable for on-line, continuous processes.

Part of the information defining the relationships between code and text characters resides in the contexts, that is, in the text itself, in both its compressed and noncompressed forms. Because of this, fewer unique code characters, and thus shorter code characters, are required to unambiguously represent compressed text. The resulting compressed texts may thereby be represented by fewer bits of information.

It will be apparent to those of ordinary skill in the art that the present invention may be embodied in yet other specific forms without departing from the spirit or essential characteristics thereof. Thus, the present embodiments are to be considered in all respects as illustrative and restrictive, the scope of the invention being indicated by the appended claims rather than by the foregoing description, and all changes which come within the meaning and range of equivalency of the claims are therefore intended to be embraced therein.

APPENDIX A                                                          THED6M.MAC

```
0106   ;       DEFINES THE HEADER RECORD FOR THE RAMDOM HOUSELTHESAURUS DATA FILE
0107   ;
0108   ;
0109   ;RHTHEAD:          ;12345678901234567890123456789012345678901234567890
0110   ;          DB      'Dictronics Random House Thesaurus. '
0111   ;          DB      '(C) Copyright 1982 by Dict. & R. H.',ODH,OAH
0112   ;IDLOC     EQU     $+1                     ;START OF THESAURUS ID
0113   ;          DB      '% 120K 1.0  s/n '      ;
0114   ;SNLOC     DB              '########%'     ;LOC OF SERIAL #
0115   ;SNLEN     EQU     $-SNLOC                 ;LENGTH OF SERIAL #
0116   ;IDLEN     EQU     $-IDLOC-1               ;LENGTH OF ID & SERIAL #
0117   ;                                          ;SANS THE %
0118   ;RHTID     DW      0001                    ; 2 bytes of PRODUCT ID #
0119   ;VERSI     DB      '1'                     ; VERSION #
0120   ;REVIS     DB      '0'                     ; REVISION #
0121   ;PRDVER    DW      3                       ; 2 BYTES OF PRODUCT VERSION
0122   ;CHKSUM    DW      0                       ;16 BIT CHECKSUM OF THESAURUS DATA
0123   ;                                          ; & PART OF THE HEADER.
0124   ;FILLEN    DW      0944                    ;HIGHEST RECORD # USED.
0125   ;          DB      0                       ;RESERVED FOR VERY LARGE FILES
0126   ;MAXENT    DW      4461                    ;MAXIMUM ENTRY NUMBER
0127   ;          DB      0                       ;RESERVED FOR VERY LARGE FILES
0128   ;COMPAT1:  DB      01H                     ;FLAGS WHICH DEFINE THE
0129   ;                                          ; (1ST IS ALPHABET)
0130   ;COMPAT2:  DB      02H                     ;COMPABILITY BETWEEN THE DRIVER
0131   ;                                          ; (2ND IS COMPRESSION ALGORITHM)
0132   ;COMPAT3:  DB      01H                     ;AND THIS DATA FILE.
0133   ;                                          ; (3RD IS OTHER FACTORS)
0134   ;TABLEBIAS DW      0                       ;POSSIBLE BIAS USED TO OFFSET TABLES
0135   ;                                          ;WHICH MAY BE COPIED INTO CORE.
0136   ;RECBIAS           DW      0                       ;POSSIBLE BIAS USED TO OFFSET
0137   ;                                          ;DATA RECORD FETCHES
0138   ;RES1:     DW      0                       ;RESERVED
0139   ;RES2:     DW      0                       ;RESERVED
0140   ;CUSTID:   DB      0,0,0,0,0,0             ;AVAILABLE
0141   ;
0142   ;0067 CHKSUM    006F COMPAT1    0070 COMPAT2    0071 COMPAT3    007A CUSTID
```

```
0143  ;0069 FILLEN      0017 IDLEN       0049 IDLOC       006C MAXENT      0080 NEXT
0144  ;0065 PRDVER      0074 RECBIAS     0076 RES1        0078 RES2        0064 REVIS
0145  ;0000 RHTHEAD     0061 RHTID       0009 SNLEN       0058 SNLOC       0072 TABLEBIAS
0146  ;0063 VERSI
0147
0148
0149
0150  LMXENT   EQU    06CH                     ;LOC OF MAX ENTRY #
0151  IDLOC    EQU    049H                     ;LOC THESAURUS ID STRING           (EF1.3)
0152  IDLEN    EQU    017H                     ;LENGTH OF THE. ID STRING          (EF1.3)
0153  CUSTID   EQU    07AH                     ;LOC CUSTOMER ID STRING            (EF1.3)
0154  IDCLEN   EQU    006H                     ;LENGTH OF CUSTOMER ID STRING      (EF1.3)
0155  COMPAT   EQU    06FH                     ;LOC OF COMPATIBILITY FLAGS        (EF1.5)
0156  PRODID   EQU    061H                     ;LOC PRODUCT ID                    (EF1.5)
0157  RHTID    EQU    0001                     ;RANDOM HOUSE ELECTRONIC           (EF1.5)
0158                                           ;THESAURUS, 1ST GENERATION ID      (EF1.5)
0159  PRDVER   EQU    065H                     ;PRODUCT VISION #                  (EF1.5)
0160  ;-----------------------------------------------------------------------
0161  ; DEFINITIONS FOR THE DATA BASE DRIVER.
0162  ;
0163  LF       EQU    0AH                      ;ASCII LINE FEED
0164  CR       EQU    0DH                      ;ASCII CARRIAGE RETURN
0165  CINFC    EQU    01H                      ;CP/M CONSOLE INPUT FUNC.
0166  COUTFC   EQU    02H                      ;CP/M CONSOLE OUTPUT FUNC.
0167  OPENFC   EQU    0FH                      ;CP/M OPEN FILE FUNCTION
0168  CLOSEFC  EQU    010H                     ;CP/M CLOSE FILE FUNCTION
0169  RRDFC    EQU    021H                     ;CP/M READ RANDOM FUNCTION
0170  SETDMA   EQU    01AH                     ;CP/M SET DMA ADDRESS FUNCTION
0171  BDOS     EQU    05H                      ;CP/M BDOS ENTRY POINT
0172  FAILED   EQU    0FFH                     ;CP/M I/O FAILED FLAG
0173  COMMA    EQU    02CH                     ;ASCII COMMA
0174
0175  MAXIWD   EQU    40                       ;LONGEST INDEX WORD +1
0176  MODE1    EQU    0                        ;1 BIT MODE                        (EF1.6)
0177  MODE2    EQU    1                        ;2 BIT MODE                        (EF1.6)
0178  MODE3    EQU    2                        ;3 BIT MODE                        (EF1.6)
0179  MODE4A   EQU    3                        ;4 BIT A MODE                      (EF1.6)
0180  MODE4B   EQU    4                        ;4 BIT B MODE                      (EF1.6)
0181  MODEFL   EQU    5                        ;FULL CHAR MODE                    (EF1.6)
0182
0183  FULCHR   EQU    6                        ;WIDTH OF A FULL CHAR FIELD (BITS)
0184  SPECODE  EQU    ' '                      ;SPECIAL CHAR (ASCII ALPHA.) CODES
0185                                           ;BELOW THIS ARE SPECIAL STRINGS.
0186  AENDRC   EQU    18                       ;END OF LOGICAL RECORD CHAR (ASCII)  (EF1.4)
0187  AIXSEP   EQU    COMMA                    ;INDEX WORD SEPARATOR (ASCII)
0188                                           ;***** NOTE THIS CAN CHANGE IF LOCAL
0189                                           ;ALPHABET CHANGES. *****
0190  LENSEP   EQU    21                       ;ENTRY DATA SEPARATOR (LOCAL ALPHABET & BIASED)
0191  EODFLG   EQU    0                        ;LOCALLY USED END OF DATA FLAG
0192  ;
0193  ;-----------------------------------------------------------------------
0194           ENTRY  THESET,THESRS,THEMOR,THESKP,THECLS
0195
0196  ;                              DEFINE TABLE LABELS
0197  ;
0198           EXT    INXKEY,INXBND,INXREC,ENTREC,BYTES,LTOA,TRTABS  ;        (EF1.5)
0199           EXT    TABBEG,LLOAD             ;LOADABLE TABLE PARAMS.           (EF1.5)
0200           EXT    CFLAG1                   ;CHARACTER SET COMPAT. FLAG       (EF1.5)
0201           EXT    PVERL                    ;PRODUCT VERSION FOR LOADED DATA  (EF1.5)
0202           EXT    IIXWRD                   ;SCRATCH SPACE IN REC. TABLES     (EF1.6)
0203                                           ;USED FOR IIXWRD BELOW            (EF1.6)
0204
0205
0206  THESET:                  ;SETUP DATA BASE
0207                           ;[DE] = LOCAL OF BUFFER FOR DATA
0208                           ;[BC] = LENGTH OF BUFFER
0209                           ;[HL] = FCB FOR DATA BASE FILE
0210                           ;UPON EXIT:  CY=1, IF FILE COULD NOT BE
0211                           ; OPENED OR [BC]=0.
0212                           ;SETS DMA ADDRESS TO INTERNAL I/O BUFFER
0213                           ;IF THE INPUT FILE WAS FOUND, UPON EXIT           (EF1.3)
```

```
0214                            ;[HL] = LOC OF THESAURUS HEADER ID STRING     (EF1.3)
0215                            ;[B] = LENGTH OF SAID ID STRING.              (EF1.3)
0216                            ;[DE] = LOC OF THE HEADER CUSTOMER ID STRING  (EF1.3)
0217                            ;[C] = LENGTH OF CUSTOMER ID STRING           (EF1.3)
0218                            ;THE ID STRINGS ARE IN THE BUFFER AND ARE     (EF1.3)
0219                            ;OVERWRITTEN AFTER THE FIRST CALL TO THESRS.  (EF1.3)
0220
0221         MOV    A,B         ;MAKE SURE [BC] IS NON-ZERO
0222         ORA    C           ;
0223         STC                ;CY=1 (ERROR)
0224         RZ                 ; AND RETURN IF [BC]=0
0225         SHLD   FCBLOC      ;RETAIN ADDRESS OF FCB
0226         PUSH   D           ;PROTECT BUFFER ADDRESS
0227         LXI    D,33        ;OFFSET TO RECORD NUMER FIELD
0228         DAD    D           ;
0229         SHLD   FCBREC      ;SAVE IT FOR LATER (WE ONLY NEED TWO BYTES)
0230         XRA    A           ;ZERO THE RECORD #
0231         MOV    M,A         ;
0232         INX    H
0233         MOV    M,A
0234         INX    H
0235         MOV    M,A         ;
0236         POP    H           ;RETRIEVE BUFFER LOCATION
0237         SHLD   LOCBUF      ;RETAIN ADDRESS OF BUFFER
0238         MOV    L,C
0239         MOV    H,B
0240         SHLD   BUFLEN      ;RETAIN LENGTH OF BUFFER
0241         LXI    H,000       ;INITIALIZE
0242         SHLD   ENTRYN      ;INTERNAL ENTRY POINTER.
0243         LHLD   FCBLOC      ;FETCH BUF(LOC)
0244         XCHG               ;MOVE IT.
0245         MVI    C,OPENFC    ;[DE] = LOC(FCB)
0246         CALL   BDOS
0247         CPI    FAILED      ;DID FILE OPEN?
0248         STC                ;ASSUME NO.
0249         RZ                 ;RETURN CY=1 IF NO. (ERROR)
0250         LXI    D,DMAADR    ;OPENED. SET I/O ADDRESS
0251         MVI    C,SETDMA    ;SET DMA FUNCTION CODE
0252         CALL   BDOS
0253         LHLD   FCBLOC      ;READ THE HEADER RECORD.
0254         XCHG               ;[DE]=FCB LOCATION
0255         MVI    C,RRDFC     ;RANDOM READ RECORD # 0
0256         CALL   BDOS        ;
0257         ORA    A           ;ANY PROBLEMS?
0258         JNZ    BADEXT      ;IF YES. ERROR RETURN
0259                            ;OTHEREWISE RETURN WITH CY=0
0260         LHLD   DMAADR+PRODID  ;FETCH PRODUCT ID.                          (EF1.5)
0261         LXI    D,RHTID     ;ID FOR RANDOM HOUSE THESAURUS, 1ST GEN       (EF1.5)
0262
0263         MOV    A,D         ;DOES THIS FILE CONTAIN THE 1ST GENERAT-(EF1.5)
0264         CMP    H           ;ION OF RANDOM HOUSE ELECTRONIC THES.?  (EF1.5)
0265         JNZ    BADEXT      ;IF NO, ERROR                          (EF1.5)
0266         MOV    A,E         ; (CHECK FULL PRODUCT ID)              (EF1.5)
0267         CMP    L           ;                                      (EF1.5)
0268         JNZ    BADEXT      ;IF NOT OUR THESAURUS, SKIP            (EF1.5)
0269                            ;TEST COMPATIBILITY FLAGS              (EF1.5)
0270         LXI    H,DMAADR+COMPAT ;BASE OF FLAG LIST                 (EF1.5)
0271                            ;FOR THE DATA FILE.                    (EF1.5)
0272         LDA    CFLAG1      ;SAME ALPHABET?                        (EF1.5)
0273         CMP    M           ;                                      (EF1.5)
0274         JNZ    BADEXT      ;IF NO, CAN NOT READ THIS FILE. ERROR  (EF1.5)
0275         INX    H           ;MOVE TO FLAG 2                        (EF1.5)
0276         LDA    CFLAG2      ;SAME COMPRESSION ALGORITHM?           (EF1.5)
0277         CMP    M           ;                                      (EF1.5)
0278         JNZ    BADEXT      ;IF NO, CAN NOT READ THIS FILE. ERROR  (EF1.5)
0279         INX    H           ;MOVE TO FLAG 3                        (EF1.5)
0280         LDA    CFLAG3      ;IS EVERYTHING ELSE COMPATIBLE?        (EF1.5)
0281         CMP    M           ;                                      (EF1.5)
0282         JNZ    BADEXT      ;IF NO, CAN NOT READ THIS FILL. ERROR  (EF1.5)
0283         LHLD   DMAADR+LMXENT ;FETCH MAX. ENTRY # FROM THE HEADER
0284         SHLD   MAXENT      ;AND SAVE IT.
```

```
0285                                    ;NOW THAT WE KNOW THAT WE CAN HANDLE THE(EF1.5)
0286                                    ;DATA FILE, IS IT THE ONE FOR WHICH THE (EF1.5)
0287                                    ;THE TABLES HAVE BEEN PRELOADED?          (EF1.5)
0288         LXI     H,DMAADR+PRDVER    ;LOC PRODUCT VERSION                      (EF1.5)
0289         LDA     PVERL              ;IS THIS VERSION PRELOADED?               (EF1.5)
0290         CMP     M                  ;                                         (EF1.5)
0291         JNZ     THELOD             ;IF NO, GO LOAD THE TABLES                (EF1.5)
0292         INX     H                  ;2 BYTE TEST                              (EF1.5)
0293         LDA     PVERL+1            ;                                         (EF1.5)
0294         CMP     M                  ;I REPEAT, IS THIS LOADED?                (EF1.5)
0295         JZ      THEOO              ;IF YES, THEN GET OUT                     (EF1.5)
0296 THELOD:                            ;LOAD THE TABLES FOR DIFFERENT            (EF1.5)
0297                                    ;PRODUCT VERSION                          (EF1.5)
0298
0299         LDA     LLOAD              ; LENGTH OF THE LOAD IN CP/M RECORDS      (EF1.5)
0300         LXI     B,0001             ;RECORD NUMBER TO READ (1ST IS 1)         (EF1.5)
0301         LXI     D,TABBEG           ;LOC(TABLES) FOR INPUT                    (EF1.5)
0302                                    ;TABLE LOADING LOOP.                      (EF1.5)
0303 THELD1: LHLD    FCBREC             ;FCB REC # LOCATION                       (EF1.5)
0304         MOV     M,C                ;SET REC #                                (EF1.5)
0305         INX     H                  ;                                         (EF1.5)
0306         MOV     M,B                ;                                         (EF1.5)
0307         PUSH    PSW                ;PROTECT THE REGISTERS                    (EF1.5)
0308         PUSH    B                  ;                                         (EF1.5)
0309         PUSH    D                  ;                                         (EF1.5)
0310         MVI     C,SETDMA           ;SET DMA ADDRESS FOR INPUT DIRECTLY TO    (EF1.5)
0311         CALL    BDOS               ; THE TABLE AREA                          (EF1.5)
0312         MVI     C,RRDFC            ;NOW READ THE NEXT RECORD                 (EF1.5)
0313         LHLD    FCBLOC             ;                                         (EF1.5)
0314         XCHG                       ;[DE]=LOC(FCB)                            (EF1.5)
0315         CALL    BDOS               ;    DO IT                                (EF1.5)
0316                                    ;IGNORE READ ERRORS, WILL BLOW ELSEWHERE(EF1.5)
0317         POP     D                  ;RESTORE REGS.                            (EF1.5)
0318         LXI     H,128              ;UPDATE DMA ADDRESS                       (EF1.5)
0319         DAD     D                  ;                                         (EF1.5)
0320         XCHG                       ;[DE] HAS NEW DMA ADDRESS                 (EF1.5)
0321         POP     B                  ;                                         (EF1.5)
0322         POP     PSW                ;                                         (EF1.5)
0323         INX     B                  ;UPDATE RECORD #                          (EF1.5)
0324         DCR     A                  ;FINISHED?                                (EF1.5)
0325         JNZ     THELD1             ;IF NO LOOP.                              (EF1.5)
0326                                    ;AT LAST.                                 (EF1.5)
0327
0328 THEOO:                              ;RETURN LOC THESAURUS ID STRING IN [HL]  (EF1.3)
0329         LXI     H,DMAADR+IDLOC     ; FOR IDENTIFICATION                      (EF1.3)
0330         LXI     D,DMAADR+CUSTID    ;RETURN LOC CUSTOMER ID STRING IN [DE]    (EF1.3)
0331         MVI     B,IDLEN            ;[B]=LENGTH OF THESAURUS ID STRING        (EF1.3)
0332         MVI     C,IDCLEN           ;[C]=LENGTH OF CUSTOMER ID STRING         (EF1.3)
0333         XRA     A                  ;SET CY=0, FILE OPENED OK                 (EF1.5)
0334         RET
0335
0336 ;-----------------------------------------------------------------------------
0337 THESRS:          ;[HL] = LOC(INDEX WORD) FOLLOWED BY 0
0338                  ; THE WORD MUST BE ASCII LOWER CASE.
0339         ;UPON EXIT:
0340         ; CY=1 IF INDEX WORD WAS NOT FOUND
0341                  ; IN WHICH CASE THE INTERNAL POINTER RESTS AT
0342                  ; THE WORD FOLLOWING WHERE THE INDEX WORD WOULD
0343                  ; BE LOCATED (OR THESET WAS NOT CALLED).
0344                                                                              (EF1.2)
0345         ; CY=1 & Z=0 ==> THE INT. PTR IS AT NEXT ENTRY IN LEXICAL ORDER      (EF1.2)
0346         ; CY=1 & Z=1 ==> THE INT. PTR IS AT THE FINAL ENTRY WORD AND         (EF1.2)
0347                 ;THE USER TARGET IS LEXICALLY AFTER IT.                      (EF1.2)
0348
0349         ; CY=0 & Z=0 ==> TARGET WORD FOUND AND ALL DATA IN THE BUFFER.
0350         ; CY=0 & Z=1 IF ONLY PART OF THE DATA FIT INTO THE BUFFER
0351
0352                  ;SETS THE CP/M DMA ADDRESS TO ITS INTERNAL I/O BUF.
0353                  ;NOTE:  IF THE USER IS PASSING THE THE STRING LOCATION
0354                  ;WE SUPPLIED AFTER A THESKP OPERATION WE KNOW THE ENTRY
0355                  ;NUMBER.  A SPECIAL TEST FOR THIS CASE IS OBVIOUSLY
```

```
0356                                   ;NECESSARY SINCE WE CAN NOT USE THE SAME CORE FOR 2
0357                                   ;THINGS.
0358            SHLD    USRSTR         ;SAVE LOC(USERS WORD)
0359            LHLD    MAXENT         ;TEST FOR PRIOR OPENNING CALL
0360            MOV     A,L            ;
0361            ORA     H              ;
0362            STC                    ;ASSUME NOT OPENED.
0363            RZ                     ;RETURN WITH CY=1 IF NOT OPENED
0364            LXI     D,IIXWRD       ;LOC(INTERNAL POINTERS STRING)
0365            LHLD    USRSTR         ;LOC(USER SUPPLIED STRING)
0366            CALL    CMPDEHL        ;ARE THEY THE SAME?
0367            JZ      THESR1         ;IF YES SKIP LOOK UP.
0368            CALL    LOOKUP         ;LOOK USERS WORD UP.
0369            RC                     ;IF NOT FOUND RETURN WITH CY=1 &    (EF1.2)
0370                                   ;   Z=1 IF USERS WORD IS BEYOND BACK OF  (EF1.2)
0371                                   ;   THE THESAURUS, Z=0 OTHERWISE        (EF1.2)
0372    THESR1: CALL    ILEBYN         ;LOOK UP ENTRY BY NUMBER
0373            XRA     A              ;SET DEFINITION NUMBER = 0
0374            STA     SPCODE         ;CLEAR SPECIAL CODE FLAG
0375            MVI     A,OFFH         ;SHOW DATA HAS BEEN READ
0376            STA     DATAIN         ;COULD JUST AUTO READ 1ST ENTRY OF THESAURS
0377                                   ;INSTEAD.
0378            JMP     THEMOR         ;GO RETURN DATA TO USER.
0379    ;---------------------------------------------------------------------
0380    THEMOR:                        ;CALLED AFTER Z=1 RETURN FROM THESRS.
0381                                   ;RETURNS MORE DATA IN THE USER BUFFER.
0382                                   ;Z=1 UPON EXIT IF STILL MORE DATA REMAINS TO BE
0383                                   ;RETURNED.
0384                                   ;CY=1 IF CALL IS OUT OF SEQUENCE (MOST LIKELY TO
0385                                   ; HAPPEN WHEN THEMOR IS CALLED AFTER THESRS FAILED
0386                                   ; TO LOCATE THE USERS WORD.)
0387
0388            LDA     DATAIN         ;HAS A VALID ENTRY BEEN SET UP?
0389            CPI     OFFH           ;FLAG = OFFH IF YES.
0390            RC                     ;IF NO.  RETURN WITH CY=1
0391                                   ;RESET POINTERS
0392            MVI     A,001H         ;SHOW NO PREVIOUS CHARACTER.
0393            STA     INHAND         ; FOR FORMATTING
0394            LHLD    BUFLEN         ;BUFFER IS EMPTY.
0395            XCHG
0396            LHLD    LOCBUF         ;INDEX IS AT BEGINNING OF THE BUFFER
0397                                   ;[HL] = BUFFER INDEX
0398                                   ;[DE] = BUFFER COUNTER
0399    MOROO:  MOV     A,E            ;TEST FOR FULL BUFFER.
0400            ORA     D              ;
0401            RZ                     ;RETURN IF BUFFER IS FULL
0402                                   ;NOTE: Z=1 TO SHOW WE HAVE MORE DATA
0403            PUSH    D              ;PROTECT
0404            PUSH    H
0405            CALL    NEXTC          ;GET NEXT CHAR (ASCII) IN [A]
0406                                   ;(EXPANDS , ; :)
0407            POP     H              ;RESTORE
0408            POP     D
0409            MOV     M,A            ;PUT INTO THE BUFFER
0410            CPI     EODFLG         ;= END OF ENTRY FLAG.
0411            JZ      MORO1          ;IF YES SKIP
0412            INX     H              ;NO.  UPDATE BUFFER INDEX.
0413            DCX     D              ;     AND COUNTER
0414            JMP     MOROO          ;THEN RETURN FOR NEXT DATA CHAR.
0415    MORO1:                         ;HIT END OF ENTRY
0416                                   ;[0] IS ALREADY IN BUFFER.
0417            STA     DATAIN         ;TURN OFF DATA IN FLAG
0418            ADI     1              ;SET Z=0, CY=0 TO SHOW END OF DATA
0419            RET                    ;RETURN TO CALLER
0420
0421    ;---------------------------------------------------------------------
0422    ;---------------------------------------------------------------------
0423    ; NEXTC RETURNS THE NEXT ENTRY DATA CHARACER IN [A].  IT DIFFERS FROM
0424    ;       NXTCHR ONLY IN THAT IT INSERTS BLANKS AFTER CERTAIN CHARACTRS.
0425    ;
0426    NEXTC:  LDA     WAITING        ;ANYTHING WAITING?
```

```
0427            ORA     A
0428            JZ      NEXT10          ;SKIP IF NO.
0429            DCR     A               ;OTHERWISE DECREMENT COUNTER
0430            STA     WAITING         ;SAVE REMAINING COUNT
0431            LHLD    STRINX          ;AND FETCH CHARACTER
0432            MOV     A,M
0433            INX     H               ;UPDATE THE STRING INDEX
0434            SHLD    STRINX
0435            RET
0436    NEXT10: CALL    NXTCHR          ;FETCH NEXT CHARACTER.
0437            CPI     'A'             ;MOST LIKELY ITS AN ALPAHBETIC CHARACTER
0438            RNC                     ; SO MAKE TEST AS SHORT AS POSSIBLE
0439            CPI     '@'             ;IS IT A COMMA IN A PARTS OF SP. LIST?  (EF1.4)
0440            JZ      NEXT25          ;IF YES, GO CHANGE IT TO COMMA           (EF1.4)
0441            CPI     ','             ;COMMA?
0442            JZ      NEXT20
0443            CPI     ';'             ;SEMICOLON?
0444            JZ      NEXT30
0445            CPI     ':'             ;COLON
0446            JZ      NEXT40
0447            RET
0448
0449    NEXT20: LDA     STRCOM          ;COMMA
0450            LXI     H,STRCOM+1
0451            JMP     NEXT50
0452    NEXT25: MVI     A,','           ;'@' ==> ',' WITHOUT TRAILING SPACE      (EF1.4)
0453            RET                     ;                                        (EF1.4)
0454    NEXT30: LDA     STRSEM          ;SEMICOLON
0455            LXI     H,STRSEM+1
0456            JMP     NEXT50
0457    NEXT40: LDA     STRCOL          ;COLON
0458            LXI     H,STRCOL+1
0459    NEXT50:
0460            STA     WAITING         ;# OF CHARS WAITING
0461            SHLD    STRINX          ;WHERE THEY ARE WAITING.
0462            JMP     NEXTC           ;GO PRECESS 1ST CHAR.
0463
0464    STRSEM: DB      2,';'           ;REPLACES SEMICOLON
0465    STRCOL: DB      3,':'           ;PLACES COLON
0466    STRCOM: DB      2,','           ;REPLACES COMMA
0467    WAITING:DB      0               ;# OF CHARS. HOLDING IN LOCAL STRING.
0468    STRINX: DW      0               ;INDEX TO THE NEXT CHAR IN THAT STRING.
0469
0470
0471    ;----------------------------------------------------------------------
0472    THESKP:                         ;N=[A], MOVE INTERNAL POINTER 128-N ENTRIES.
0473                                    ;UPON EXIT [HL] = LOC(INDEX WORD) FOLLOWED BY 0.
0474                                    ;CY=1, IF HIT END OR BEGINNING OF THESAURUS IN WHICH
0475                                    ; CASE THE INTERNAL POINTER IS UNCHANGED.
0476            CPI     128             ;0 MOVE? USED TO GET INDEX WORD
0477            JZ      SKIP5           ; JUMP IF YES.
0478            JC      SKIP2           ;MOVE INDEX BACKWARD?
0479                                    ;NO. FORWARD.
0480            SUI     128             ;[A]=# OF ENTRIES FORWARD TO MOVE
0481            MVI     D,0             ;[DE]=    "       "
0482            MOV     E,A
0483            LHLD    ENTRYN          ;[HL] = CURRENT ENTRY #
0484            CALL    ADDDEHL         ;[BC]=[HL]+[DE]
0485            MOV     E,C             ;PUT RESULT IN [DE]
0486            MOV     D,B             ;THEN SEE IF IT OVERRUNS THE END OF THE
0487            LHLD    MAXENT          ;THESAURUS. [HL] = LAST ENTRY NUMBER
0488            CALL    SUBDEHL         ;COMPARE THEM
0489            JC      SKIP1           ;DO NOT MOVE POINTER IF END WOULD BE HIT
0490            XCHG                    ;[HL] NOW = NEW ENTRY #
0491    SKIP0:  SHLD    ENTRYN          ;UPDATE THE INTERNAL POINTER (ENTRY #)
0492            CALL    ILCBYN          ;LOCATE THE ENTRY BY NUMBER
0493            CALL    RDINX           ;AND BUILD ITS INDEX WORD IN IIXWRD.
0494            LXI     H,IIXWRD        ;GIVE CALLER LOCATION OF THE STRING.
0495            XRA     A               ;CY=0, RETURN
0496            RET
0497
```

```
0498  SKIP1:  LXI    H,IIXWRD     ;GIVE CALLER LOCATION OF CURRENT WORD  (EF1.1)
0499  BADEXT: STC                 ;CAN NOT MOVE POINTER, RETURN CY=1.    (EF1.6)
0500          RET
0501  SKIP2:                      ;MOVE POINTER BACKWARD
0502          MOV    B,A          ;[B]=N
0503          MVI    A,128        ;COMPUTE
0504          SUB    B            ;128-N (N<128)
0505          MOV    E,A          ;[DE]=128-N (16 BITS)
0506          MVI    D,0          ;
0507          LHLD   ENTRYN       ;CURRENT ENTRY #
0508          CALL   SUBDEHL      ;[BC]=[HL]-[DE]
0509          JC     SKIP1        ;OVERRUN THE BEGINNING OF THE THESAURUS?
0510          JZ     SKIP1        ;DITTO.
0511          MOV    L,C          ;NO.  UPDATE POINTER
0512          MOV    H,B
0513          JMP    SKIP0        ;GO DO UPDATE AND GET INDEX WORD INTO CORE.
0514
0515  SKIP5:                      ;0 MOVE, JUST RETURN PTR. TO WORD
0516          LHLD   ENTRYN       ;UNLESS WE DO NOT HAVE ONE.
0517          MOV    A,L          ;WHICH ONLY HAPPENS IF THESKP IS CALLED
0518          ORA    H            ;BEFORE THESRS.
0519          JZ     SKIP1        ;NOTHING IN-HAND.  SAY HIT END OF DIC.
0520          LDA    IIXWRD       ;TEST FOR INDEX WORD IN CORE.  IF SET
0521          ORA    A            ;POINTER JUST BEYOND END OF A LOGICAL REC.
0522          JZ     SKIP0        ;IT WILL NOT BE IN CORE - SO FETCH IF NEC.
0523                              ;ITS VALID AND IN CORE.  JUST RETURN ITS LOC.
0524          LXI    H,IIXWRD     ;[HL] POINTS TO WORD,0
0525          XRA    A            ;SET CY=0
0526          RET
0527  ;------------------------------------------------------------------------
0528  THECLS:                     ;CLOSE FILE, CLEAN UP ANYTHING.
0529                              ;CY=1 IF ANY PROBLEMS.
0530
0531          LHLD   FCBLOC       ;CLOSE THE FILE
0532          XCHG                ;[DE] = LOC(FCB)                       (EF1.2)
0533          MVI    C,CLOSEFC    ;
0534          CALL   BDOS
0535          XRA    A            ;SET CY=0
0536          RET
0537
0538  ;------------------------------------------------------------------------
0539  ; LOOKUP  LOOKS UP THE USER SUPPLIED INDEX WORD.  UPON EXIT ENTRYN CONTAINS
0540  ;         THE # OF THE ENTRY IF THE WORD WAS FOUND. OTHERWISE CY=1 TO INDICATE
0541  ;         THAT IT WAS NOT FOUND AND ENTRY # POINTS TO THE INDEX WORD WHICH
0542  ;         FOLLOWS THE USERS WORD IN A LEXICAL SENSE (UNLESS IT OVERRAN THE
0543  ;         END OF THE LIST IN WHICH CASE ERNTRYN POINTS TO THE LAST ENTRY).
0544  ;
0545  LOOKUP:
0546          LHLD   USRSTR       ;LOC(USERS WORD)
0547          CALL   BLDKEY       ;BUILD ITS KEY IN [BC]
0548          LXI    H,INXKEY     ;[HL] = BASE OF KEY TABLE
0549          CALL   SRCHA1       ;SEARCH TABLE TO FIND LOGICAL RECORD #
0550  LOOK00: SHLD   LRNT2        ;SAVE LOGICAL RECORD # * 2             (EF1.1)
0551          MOV    C,L          ;[BC] = 2*LOGICAL RECORD #
0552          MOV    B,H
0553          LXI    H,INXBND-2   ;FIND MIN. ENTRY # IN THIS LOGICAL RECORD
0554          DAD    B            ;BY FINDING MAX. IN LAST AND ADDING 1
0555          MOV    E,M          ;FETCH MAC. ENTRY # IN PREVIOUS RECORD
0556          INX    H
0557          MOV    D,M
0558          INX    D            ;+1 = 1ST ENTRY # IN THIS RECORD
0559          XCHG
0560          SHLD   ENTRYN       ;SET ENTRY # TO START OF RECORD.
0561          LXI    H,INXREC     ;NOW.  SET UP PARAMETERS TO BEGIN READING.
0562          DAD    B            ;GET 1ST PHYSICAL RECORD #
0563          MOV    E,M
0564          INX    H
0565          MOV    D,M
0566          PUSH   D            ;SAVE CP/M RECORD #
0567          LXI    H,BYTES      ;GET BYTE OFFSET INTO THIS RECORD.     (EF1.5)
0568          DAD    B
```

```
0569              MOV      A,M            ;[A]=OFFSET
0570              POP      B              ;[BC]=PHYSICAL RECORD NUMBER
0571              CALL     SUPLREC        ;SET UP TO READ.
0572                                      ;SEARCH FOR INDEX WORD LOOP
0573              MVI      A,OFFH         ;SHOW NO TAB ACTIVE                (EF1.3)
0574              STA      TAB            ;                                  (EF1.3)
0575    LOOKO1:   CALL     RDINX          ;READ THE NEXT INDEX WORD
0576              JC       LOOKO2         ;IF NOT IN RECORD SKIP
0577              LXI      D,IIXWRD       ;[DE]=LOC(INDEX WORD FROM DATABASE)
0578              LHLD     USRSTR         ;[HL]=LOC(USERS WORD)
0579              CALL     CMPSTR         ;COMPARE STRINGS: [DE] TO [HL]
0580              RZ                      ;IF THEY MATCH RETURN WITH CY=0
0581              RC                      ;IF WE OVERRAN RETURN WITH CY=1 & Z=0  (EF1.2)
0582                                      ; (NOT FOUND, POINTS TO FOLLOWING SLOT)
0583              LHLD     ENTRYN         ;OTHEREWISE INCREMENT ENTRY #
0584              INX      H
0585              SHLD     ENTRYN         ;AND TRY NEXT INDEX WORD -
0586                                      ;IN THE LATTER CASE RETURN A NO FIND CY=1
0587              JMP      LOOKO1         ;OTHEREWISE LOOP
0588
0589    LOOKO2:   LHLD     MAXENT         ;WAS NOT IN THIS RECORD (CAN NOT BE IN NEXT)
0590              XCHG                    ;SO IT ISNT THERE.  SET POINTER TO NEXT
0591              LHLD     ENTRYN         ;ENTRY UNLESS AT END OF THESAURUS.
0592              CALL     CMPDEHL        ;IN WHICH CASE SET IT TO END OF THESAURUS.
0593              JC       LOOKO3         ;IF MAXENT > ENTRYN SKIP
0594              XCHG                    ;OTHEREWISE ENTRYN = MAXENT
0595              SHLD     ENTRYN         ;
0596                                      ;THE INDEX WORD IS NOT IN CORE SO FLAG
0597              XRA      A              ;IT IN CASE AN ATTEMPT IS MADE TO FETCH IT
0598              STA      IIXWRD         ;WITH THESKP
0599              STC                     ;CY=1 BECAUSE WE DID NOT FIND USERS WORD
0600                                      ; & Z=1 BECAUSE IT IS BEYOND BACK OF THE(EF1.2)
0601              RET
0602    LOOKO3:                           ;NOT IN THIS RECORD, GO TO NEXT     (EF1.1)
0603              LHLD     LRNT2          ; BY INCREMENT LOGICAL REC. #       (EF1.1)
0604              INX      H              ; TO NEXT REC.                      (EF1.1)
0605              INX      H              ; (WORD VALUES, SO 2 BYTES)         (EF1.1)
0606              SHLD     LRNT2          ;                                   (EF1.1)
0607              JMP      LOOKO0         ;GO SEARCH NEXT RECORD              (EF1.1)
0608
0609    ;---------------------------------------------------------------------
0610    ; RDINX  READ THE NEXT INDEX INTO CORE AT IIXWRD
0611    ;
0612    RDINX:    LXI      H,IIXWRD       ;ESTABLISH RECEIVING ADDRESS        (EF1.6)
0613              DCX      H              ;IIXWRD-1 WILL NOT WORK ON SOME ASSEM.S (EF1.6)
0614              LDA      TAB            ;TEST FOR VERY FIRST CHAR IN REC    (EF1.3)
0615              INR      A              ;OFFH IF FIRST                      (EF1.3)
0616              JNZ      RDINOA         ;IF NOT FIRST INDEX WORD SKIP       (EF1.3)
0617              STA      TAB            ;ZERO TAB TO TURN OFF 1ST FLAG      (EF1.3)
0618              JMP      RDINXLP        ;AND GO FETCH THE 1ST WORD          (EF1.3)
0619    RDINOA:   PUSH     H              ;FETCH THE TAB CHARACTER            (EF1.3)
0620              CALL     NXTCHR         ;[A]=BIASED TAB CHARACTER           (EF1.3)
0621              POP      H              ;                                   (EF1.3)
0622              CPI      AENDRC         ;WATCH FOR END OF RECORD            (EF1.3)
0623              JZ       RDINO1         ; WHICH WILL APPEAR IN PLACE OF A TAB (EF1.3)
0624                                      ;COMPUTE THE TAB VALUE              (EF1.4)
0625              XCHG                    ;SAVE THE INDEX WORD INDEX IN [DE]  (EF1.4)
0626              LXI      H,TABVS        ;[HL]=LOC(BASE TAB VALUE TABLE)     (EF1.4)
0627              MVI      B,-TABVSL      ;[B]=-LENTH(TAB VALUE TABLE)        (EF1.4)
0628    RDTAB1:   CMP      M              ;DOES TAB = TAB TABLE ENTRY i?      (EF1.4)
0629              JZ       RDTAB3         ; IF YES, WE HAVE TAB VALUE SO SKIP (EF1.4)
0630              INX      H              ; OTHERWISE, INCRMENT TO NEXT TABLE ENT.(EF1.4)
0631              INR      B              ; & COUNT UP FROM -TABLE LENGTH     (EF1.4)
0632                                      ;[B]=(-MAX.TAB + i)                 (EF1.4)
0633              JNZ      RDTAB1         ; LOOP (SHOULD ALWAYS HAPPEN)       (EF1.4)
0634                                      ; OOPS! SOMEBODY SCREWED UP.        (EF1.4)
0635    RDTAB3:   MVI      A,TABVSL       ;COMPUTE TAB OFFSET. [A]=MAX. TAB VAL. (EF1.4)
0636              ADD      B              ;TAB = MAX.TAB + (-MAX.TAB+i)       (EF1.4)
0637              XCHG                    ;RESTORE [HL]=INDEX WORD INDEX      (EF1.4)
0638              MOV      E,A            ;[DE] HOLDS TAB                     (EF1.3)
0639              MVI      D,0            ;                                   (EF1.3)
```

```
0640            DAD     D               ;DO TAB OFFSET ON PREVIOUS WORD          (EF1.3)
0641  RDINXLP:
0642            INX     H               ;INCREMENT RECEIVING ADDRESS
0643            PUSH    H               ;SAVE
0644
0645  RDINOB:   CALL    NXTCHR          ;[A]=NEXT CHAR (ASCII)                   (EF1.3)
0646            POP     H
0647            MOV     M,A             ;SAVE THE CHARACTER
0648  ;         CPI     AENDRC          ;IS IT END OF RECORD?
0649  ;         JZ      RDINO1          ;IF SO RETURN WITH CY=1
0650            CPI     AIXSEP          ;END OF INDEX WORD?
0651            JNZ     RDINXLP         ;IF NO LOOP
0652            XRA     A               ;IF YES REPLACE IT WITH STRING TERM.
0653            MOV     M,A
0654            RET                     ;AND RETURN WITH CY=0
0655  RDINO1:   XRA     A               ;INSERT 0
0656            INX     H               ;OUTPUT 0 TO BE CONSISTENT               (EF1.3)
0657            MOV     M,A
0658            STC                     ;RETURN WITH CY=1 ==> NOT IN THIS RECORD
0659            RET
0660  ;                 SORRY, NO EXPLANATION OF THE FOLLOWING TABLE.            (EF1.4)
0661  TABVS:    DB      'frdscpaietbumhlo' ;CHARACTER i HAS TAB VALUE pos(i)-1   (EF1.4)
0662  TABVSL    EQU     $-TABVS         ;LENGTH OF TAB VALUE TABLE               (EF1.4)
0663  ;---------------------------------------------------------------
0664  ; CMPSTR  COMPARE TWO STRINGS - LOCATED AT [HL] AND [DE] AND ENDING WITH 0
0665  ;         UPON EXIT Z=1 IF THEY ARE EQUAL.
0666  ;         CY=1 IF STRING([DE])>STRING([HL]) IN A LEXICAL SENSE.
0667  ;
0668  CMPSTR:   LDAX    D               ;FETCH A CHAR.
0669            CMP     M               ;COMPARE IT WITH THE OTHER IN MEMORY
0670            CMC                     ;REVERSE THE SENSE OF CY
0671            RNZ                     ;RETURN IF THE CHARACTERS ARE NOT EQUAL
0672            ORA     A               ;TEST FOR END OF STRINGS
0673            RZ                      ;IF END OF STRING RETURN
0674            INX     H               ;OTHEREWISE INCREMENT INDEXES
0675            INX     D
0676            JMP     CMPSTR          ;AND LOOP
0677
0678  ;---------------------------------------------------------------
0679  ; BLDKEY  BUILDS A WORD KEY USED TO FIND THE LOGICAL RECORD WHICH CONTAINS
0680  ;         THE INDEX WORD SUPPLIED BY THE USER.
0681  ;         THE KEY CONSISTS OF 5 BITS PER CHAR. ALL LEFT ADJUST AND 0 IN
0682  ;         THE LAST BIT (THE CHAR IS BIAS BY -'a'.)
0683  ;         [HL] = BASE OF STRING ON ENTRY
0684  ;         [BC] = KEY ON EXIT.
0685  BLDKEY:   MOV     A,M             ;1ST CHAR.
0686            INX     H               ;INDEX TO NEXT CHAR
0687            SUI     'a'             ;BIAS IT.
0688            RLC                     ;SHIFT 3 BITS LEFT
0689            RLC
0690            RLC                     ;TO PUT CHAR IN TOP 5 BITS
0691            MOV     B,A             ;SAVE IT.
0692            MOV     A,M             ;2ND CHAR.
0693            INX     H               ;INDEX TO NEXT CHAR
0694            ORA     A               ;WATCH OUT FOR SINGLE CHAR
0695            JNZ     BLDK1           ; USED WHEN JUST SEARCHING
0696            MVI     A,'a'           ;FILL OUT WITH 'a'
0697            DCX     H               ;DECREMENT SO WE WILL FILL 3RD ONE ALSO
0698  BLDK1:    SUI     'a'             ;BIAS IT.
0699            PUSH    PSW             ;SAVE IT
0700            RRC                     ;GET TOP 3 BITS
0701            RRC                     ; BY SHIFTING DOWN 2 BITS
0702            ANI     07H             ; AND MASKING THEM OFF
0703            ORA     B               ;COMPLETE TOP BYTE OF THE KEY
0704            MOV     B,A             ;SAVE IT.
0705            POP     PSW             ;RESTORE 2ND CHAR (BIASED)
0706            ANI     3               ;KEEP LOW 2 BITS
0707            RRC                     ;SHIFT INTO TOP 2 BITS.
0708            RRC
0709            MOV     C,A             ;SAVE RESULT
0710            MOV     A,M             ;3RD CHAR
```

```
0711            ORA     A               ;TEST FOR 0 AT END OF STRING
0712            JNZ     BLDK2
0713            MVI     A,'a'           ;REPLACE NULL CHAR WITH 'a'
0714    BLDK2:  SUI     'a'             ;BIAS IT
0715            RLC                     ;LEFT 1 BIT
0716            ORA     C               ;COMPLETES BOTTOM BYTE OF THE KEY
0717            MOV     C,A
0718            RET
0719
0720    ;------------------------------------------------------------------
0721    ; ILCBYN  GIVEN AN ENTRY #, POSITION THE READ MACHINERY TO IT SO THAT
0722    ;         SUBSEQUENT CHARACTER FETCHES WILL READ THE INDEX WORD.
0723    ;
0724    ILCBYN:                          ;[HL] = ENTRY #
0725                                     ;RETURN WITH CORRESPONDING INDEX WORD IN IIXWRD
0726                                     ;AREA.
0727            SHLD    ENTRYN          ;SAVE ENTRY #
0728            LXI     H,INXREC        ;POINT TO INDEX RECORD
0729            SHLD    RECTAB          ; TABLE
0730            LXI     H,BYTES         ; AND ITS BYTE OFFSET TABLE        (EF1.5)
0731            SHLD    BYTABL          ;
0732            LXI     H,RDINX         ;LOC(ROUTINE TO READ NEXT INDEX WORD) (EF1.3)
0733            SHLD    SKPRN           ;IS PLUGGED INTO CODE              (EF1.3)
0734            MVI     A,0FFH          ;RESET TAB                         (EF1.3)
0735            STA     TAB             ;                                  (EF1.3)
0736
0737            MVI     A,AIXSEP        ;INDEX WORD SEPARATOR (ASCII ALPHABET)
0738                                    ;CONTENTS OF [A] NO LONGER MATTER  (EF1.3)
0739            CALL    FIXEN           ;POSITION TO THE INDEX WORD
0740                                    ;NEXT INDEX IS THE ONE WE WANT.
0741            RET                     ;FINIS
0742
0743    ;------------------------------------------------------------------
0744    ; ILEBYN   FIND (POSITION TO) THE DESIRED ENTRY DATA.  UPON EXIT THE READ
0745    ;         MACHINERY IS SET UP SO THAT SUBSEQUENT CHARACTER FETCH CALLS
0746    ;         RETURN DATA FROM THE TARGET.
0747    ;         PRIOR TO CALLING 'ENTRYN' MUST CONTAIN THE TARGET #.
0748    ;
0749    ILEBYN:
0750            LXI     H,ENTREC        ;POINT TO ENTRY DATA RECORD
0751            SHLD    RECTAB          ; TABLE
0752            LXI     H,BYTES+1       ; AND ITS BYTE OFFSET TABLE        (EF1.5)
0753            SHLD    BYTABL
0754            LXI     H,GNXTCHR       ;SET CHARACTER FETCHER TO LOCAL ALPHABET MODE
0755            SHLD    SKPCHR          ; (BIASED)
0756            LXI     H,SKPDATA       ;LOC(ROUTINE TO SKIP AN ENTRY)     (EF1.3)
0757            SHLD    SKPRN           ;IS PLUGGED INTO CODE              (EF1.3)
0758            MVI     A,LENSEP        ;ENTRY DATA SEPARATOR (LOCAL ALPHA. AND BIASED)
0759            CALL    FIXEN           ;POSITION TO THE INDEX WORD
0760                                    ;NEXT ENTRY IS THE ONE WE WANT.
0761            RET                     ;CALLER FETCHES DATA.
0762
0763    ;------------------------------------------------------------------
0764    ; FIXEN:  THIS ROUTINE FINDS THE DESIRED INDEX/DATA ENTRY BY READING THROUGH
0765    ;         THE FILE (FROM THE BEGINNING OF A LOGICAL RECORD).  UPON EXIT
0766    ;         THE NEXT ITEM (INDEX WORD/ENTRY DATA) IN THE STREAM IS THE TARGET.
0767    ;         [A]=SEPARATOR CHAR ON ENTRY.
0768    ;         'SKPCHR' MUST BE PLUGGED WITH THE APPROPRIATE CHARACTER FETCHING
0769    ;                 ROUTINE, I. E., ITS MODE MUST MATCH MODE OF THE SEPARATOR
0770    FIXEN:
0771            STA     SEP             ;SAVE THE DATA SEPARATOR
0772            LHLD    ENTRYN          ;UPDATE INDEX ENTRY NUMBER
0773            MOV     B,H             ;[BC] = TARGET
0774            MOV     C,L
0775            LXI     H,INXBND        ;BASE OF ENTRY # -> LOGICAL RECORD BOUNDARY
0776                                    ;TABLE.  RETURNED INDEX = LOGICAL REC. # * 2
0777            CALL    SRCHA1          ;SEARCH TABLE.  RETURN LOCATION IN [DE]
0778                                    ; AND   REL. OFFSET IN [HL] = 2 * LOGICAL
0779                                    ;RECORD NUMBER = LOGICAL RECORD TABLE OFFSET.
0780            SHLD    LRNT2           ;SAVE LOGICAL RECORD TABLE OFFSET.
0781            XCHG                    ;BUILD INDEX TO RECORD PARAMETERS
```

```
0782            PUSH    D               ;PROTECT REL. OFFSET
0783            DCX     H               ;INDEX TO UPPER BOUND OF PREVIOUS LOGICAL REC.
0784            DCX     H               ;
0785            MOV     E,M             ;FETCH THE ENTRY # BOUNDARY OF THE LOGICAL REC.
0786            INX     H               ;I. E., HIGHEST IN PREVIOUS REC> + 1
0787            MOV     D,M             ;
0788            INX     D               ;
0789            XCHG
0790            SHLD    FSTENT          ;# OF FIRST ENTRY IN THIS LOGICAL RECORD.
0791            POP     D               ;RESTORE TABLE OFFSET
0792            LHLD    RECTAB          ;BASE OF LOGICAL TO PHYSICAL REC # TANSL.
0793            DAD     D               ;OFFSET TO PHYSICAL RECORD NUMBER
0794            MOV     C,M             ;FETCH FILE CP/M RECORD NUMBER
0795            INX     H
0796            MOV     B,M             ;[BC] = CP/M RECORD NUMBER
0797            LHLD    BYTABL          ;BASE OF BYTE BOUNDARIES FOR LOGICAL RECS.
0798            DAD     D               ; 2 BYTES - 1ST FOR INDEX, 2ND FOR ENTRY DATA
0799            MOV     A,M             ;[A]=OFFSET TO 1ST DATA BYTE (0-127)
0800            CALL    SUPLREC         ;SET UP THE LOGICAL RECORD FOR INPUT.
0801            LHLD    ENTRYN          ;# OF ENTRY WE ARE SEEKING.
0802            XCHG
0803            LHLD    FSTENT          ;1ST IN THIS LOGICAL RECORD
0804                                    ;[HL]=# OF NEXT ENTRY IN LIST
0805                                    ;[DE]=# OF ENTRY WANTED.
0806    FSKLP:  CALL    CMPDEHL         ;ARE WE AT THE DESIRED RECORD?
0807            JZ      FOUND           ;IF YES SKIP
0808            PUSH    H               ;IF NO SKIP THE NEXT INDEX WORD.
0809            PUSH    D
0810            LDA     SEP             ;[A]=WORD/ENTRY SEPARATOR (APHABET)
0811
0812    SKPRN   EQU     $+1             ;PLUGGED WITH ADDRESS OF SKIP ROUTINE    (EF1.3)
0813            CALL    SKPDATA         ;## PLUGGED ## READ UNTIT ITS FOUND      (EF1.3)
0814            POP     D
0815            POP     H
0816            INX     H               ;INCREMENT NEXT ENTRY #
0817            JMP     FSKLP           ;LOOP UNTIL WE FIND IT.
0818    FOUND:  RET                     ;FINIS
0819
0820
0821    ;-------------------------------------------------------------------
0822    ; SUPLREC  SET UP LOGICAL RECORD FOR READING.
0823    ;          [BC] = CP/M RECORD # IN WHICH LOGICAL RECORD BEGINS.
0824    ;          [A]  = OFFSET INTO ABOVE TO 1ST BYTE OF LOGICAL RECORD. (0 TO 127)
0825    ;
0826    SUPLREC:
0827            MOV     L,C             ;SET UP FOR READING PROPER RECORD
0828            MOV     H,B
0829            DCX     H               ;(READ ROUTINE INCREMENTS BY 1)
0830            SHLD    RECNUMB         ;SAVE IT FOR THE READER
0831            PUSH    PSW             ;SAVE BYTE OFFSET
0832            CALL    GNXTREC         ;READ IN FIRST PHYSICAL RECORD
0833            POP     PSW             ;RESTORE BYTE OFFSET
0834            MOV     E,A             ;BUILD BUFFER INDEX
0835            MVI     D,0
0836            LXI     H,DMAADR        ;BUFFER LOCATION
0837            DAD     D               ;LOC(1ST BYTE OF DATA)
0838            SHLD    BUFINX          ;SAVE IT.
0839            MOV     B,A             ;FIX UP BYTE POINTERS
0840            MVI     A,128           ;AND COUNTER WHICH DECREMENTS
0841            SUB     B               ;
0842            INR     A               ;+1 FOR TOP OF LOOP COUNTER
0843            STA     CBYTEN          ; WHICH IS SAVED HERE
0844            MVI     A,1             ;BITS LEFT IN CURRENT BYTE (+1
0845            STA     CBITN           ; FOR TOP OF LOOP COUNTER)
0846            MVI     A,1             ;# OF REPEATS (+1 FOR TOP OF LOOP CNTR) (EF1.6)
0847            STA     REPCNT          ;SET UP TO PICK UP A FIELD ID..
0848                                    ;NOTE 1ST CHAR IS ALWAYS FULL CHAR MODE  (EF1.6)
0849            MVI     A,0FFH          ;CLEAR READ-AHEAD CHARACTER WAITING      (EF1.4)
0850            STA     READAH          ;FLAG.                                   (EF1.4)
0851            XRA     A               ;[A]=0
0852            STA     SPCODE          ;CLEAR SPECIAL CODE
```

```
0853            RET
0854 ;------------------------------------------------------------------
0855 ; SKPDATA    READ THE NEXT INDEX-WORD/ENTRY-DATA, I. E., SKIP THE ITEM
0856 ;           [A] = DATA SEPARATOR CHARACTER
0857 ;           PRIOR TO ENTRY SKPCHR MUST BE PLUGGED WITH THE ADDRESS OF THE
0858 ;           CHARACTER FETCHING ROUTINE.  ITS MODE MUST MATCH THAT (LOCAL/
0859 ;           ASCII) OF THE SEPARATOR.
0860 SKPDATA:
0861            MOV      B,A                 ;SEPARATOR CHARACTER
0862 SKPD01:    PUSH     B                   ;PROTECT IT
0863 SKPCHR     EQU      $+1                 ;PLUGGED WITH ADDRESS OF CHARACTER FETCHER.
0864            CALL     $-$                 ;CHAR FETCHER
0865            POP      B                   ;TEST FOR CHAR = SEPARATOR ==>
0866            CMP      B                   ;END OF FIELD?
0867            JNZ      SKPD01              ;IF NO LOOP
0868            RET                          ;OTHEREWISE, FINIS
0869
0870 ;------------------------------------------------------------------
0871 ; SRCHA1    SEARCH TABLE - ALGORITHM 1.
0872 ;           [HL] = BASE OF TABLE OF UPPER BOUNDS
0873 ;           [BC] = TARGET
0874 ; ON EXIT:  [HL] = RELATIVE INDEX TO WORD WHERE TARGET FITS (BELOW ITS LEAST
0875 ;                  UPPER BOUND).
0876 ;           [DE[ = ABSOLUTE ADDRESS FOR TARGET.
0877
0878 SRCHA1:    CALL     NHLTODE             ;[DE]=-[HL]
0879            PUSH     D                   ;SAVE NEG.
0880 SCRLP:     MOV      E,M                 ;FETCH NEXT TABLE VALUE.
0881            INX      H
0882            MOV      D,M
0883            INX      H
0884            CALL     CMPBCDE             ;[BC]<=[DE]?
0885            JC       SCRLP               ;IF NO LOOP
0886            POP      D                   ;RESTORE NEG
0887            DCX      H                   ;BACKUP 2 BYTES
0888            DCX      H
0889            XCHG                         ;DO NOT DESTROY ABSOLUTE LOCATION
0890            DAD      D                   ;COMPUTE RELATIVE OFFSET.
0891            RET                          ; RETURN WITH [HL] = RELATIVE OFFSET.
0892                                         ; & [DE]=ABSOLUTE LOCATION
0893 ;------------------------------------------------------------------
0894 ; NHLTODE   CONSTRUCT NEGATIVE OF [HL] IN [DE]
0895 ;
0896 NHLTODE:
0897            MOV      A,L                 ;FIRST CONSTRUCT COMPLEMENT OF [HL]
0898            CMA
0899            MOV      E,A
0900            MOV      A,H                 ; IN
0901            CMA
0902            MOV      D,A                 ; [DE]
0903            INX      D                   ;THEN ADD 1 TO FINISH IT OFF.
0904            RET
0905 ;------------------------------------------------------------------
0906 ; NXTCHR:   RETURNS NEXT CHAR (ASCII CODE) FROM THE DATA.  ALL SPECIAL CODES
0907           EXCEPT (0=END OF ENTRY) ARE DECODED.
0908 ;
0909 NXTCHR:
0910            LDA      SPCODE              ;PROCESSING A SPECIAL CODE?
0911            ORA      A                   ;
0912            JZ       NXTC01              ;IF NO SKIP
0913            LHLD     LOCSPC              ;IF YES RETRIEVE NEXT ASCII CHAR OF SPEC. CODE
0914 NXTC00:    DCR      A                   ;UPDATE COUNT
0915            STA      SPCODE              ;
0916            MOV      A,M                 ;FETCH IT
0917            INX      H                   ;BUMP INDEX
0918            SHLD     LOCSPC              ;AND SAVE IT.
0919            RET
0920 NXTC01:    LDA      INHAND              ;MOVE IN-HAND TO PREVIOUS CHARACTER
0921            STA      PREVC
0922            CALL     PROCHAR             ;PROCESS IT INTO ASCII
0923            RC                           ;CP=1 ==> ONLY 1 CHAR (ASCII) RETURNED IN [A]
```

```
0924                                    ;OTHEREWISE STRING IS RETURNED. [HL]=ITS LOC.
0925            JMP     NXTCOO          ;THEN BEGIN PROCESSING IT.
0926
0927    ;----------------------------------------------------------------
0928    ; PROCHAR:  OBTAIN THE NEXT CHARACTER
0929    ;          WHICH IS IN THE LOCAL ALPHABET AND BIASED.
0930    ;          RETURN THE CORRESPONDING ASCII CHARACTER OR STRING OF CHARACTERS.
0931    ;          UPON EXIT:   CY=1 ==> ASCII CHARACTER IS [A] (ONLY 1 CHAR)
0932    ;                       CY=0 ==> [A] CONTAINS A COUNT OF CHARACTERS
0933    ;                                AND [HL] POINTS TO THE FIRST ASCII CHAR.
0934    ;     A GOOD DEAL OF CODE AS ADDED TO MAKE ADJACENT PARTS OF SPEACH    (EF1.4)
0935    ;     LOOK PRETTY.                                                    (EF1.4)
0936    ;
0937    PROCHAR:
0938            LXI     H,READAH        ;IS THE NEXT CHARACTER WAITING         (EF1.4)
0939            MOV     A,M             ; FROM A PART OF SPEECH READ-AHEAD?    (EF1.4)
0940            CPI     0FFH            ; IF YES [A]=WAITING CHAR (LOC. ALPHA.) (EF1.4)
0941            MVI     M,0FFH          ;ALWAYS RESET THE WAITING FLAG.        (EF1.4)
0942            JNZ     PROCH1          ;& IF ONE WAS NOT WAITING              (EF1.4)
0943            CALL    GNXTCHR         ;GET CHAR (LOCAL ALPHABET) FROM THE DATA STR.
0944            LXI     H,LTOA          ;BASE OF LOCAL TO ASCII ALPHABET CONVERSION
0945            MOV     E,A             ;TABLE.  BUILD INDEX OUT OF LOCAL CHAR.
0946            MVI     D,0             ;[DE] CONTAINS LOCAL CHAR
0947            DAD     D               ;[HL] POINTS TO ITS ASCII CODE CHAR
0948            MOV     A,M             ;FETCH THE ASCII CODE
0949    PROCH1: STA     INHAND          ;SAVE IT FOR FORMAT CHECKING
0950            CPI     SPECODE         ;IS IT A SPECIAL CODE?
0951            CMC                     ;REVERSE SENSE OF TEST
0952            JNC     SPECHAR         ;SKIP IF YES.
0953            RET                     ;RETURN WITH CY=1, [A] = ASCII CHAR.
0954    ;
0955    SPECHAR:
0956            SUI     AENDRC          ;OTHERWISE BIAS IT DOWN TO 1ST
0957            MOV     E,A             ;SPECIAL CHARACTER TABLE
0958            MVI     D,0             ;CLEAR UPPER BYTE                      (EF1.4)
0959            LXI     H,SPECIAL       ;BASE OF SPECIAL CHARACTERS
0960            DAD     D               ;BUILD INDEX
0961            DAD     D               ;(TABLE CONTAINS 2 BYTE ENTRIES)
0962            MOV     E,M             ;FETCH THE ENTRY
0963            INX     H
0964            MOV     D,M             ;WHICH POINTS TO THE ASCII STRING REPRESENTED
0965                                    ;[DE] POINTS TO SPECIAL STRING         (EF1.4)
0966            CPI     4               ;DO WE HAVE TO WORRY ABOUT END OF SENT.?(EF1.4)
0967            JC      SPEC9           ;IF NO SKIP
0968            CPI     6               ;(NO WORRY FOR Ant.)                   (EF1.4)
0969            JZ      SPEC9           ;                                      (EF1.4)
0970            CPI     13              ;REPHRASE THE QUESTION AND POSE IT AGAIN
0971            JNC     SPEC9
0972                                    ;BUILD STRING FOR PART OF SPEECH       (EF1.4)
0973            MVI     B,00            ;LENGTH OF CONSTRUCTED STRING          (EF1.4)
0974            LXI     H,PSTRNG        ; LOC(PLACE TO BUILD STRING)           (EF1.4)
0975            PUSH    D               ;PROTECT PART OF SPEECH STRING PTR     (EF1.4)
0976            LDA     PREVC           ;MUST CHECK FOR SENTENCE ENDING
0977            CPI     ')'             ;DID IT END WITH PARENTHESIS?          (EF1.4)
0978            JZ      SPEC0           ;IF YES.  END THE SENTENCE             (EF1.4)
0979            CPI     'A'             ;DID LAST END IN SPECIAL STRING
0980            JC      SPEC1           ;IF YES SKIP.                          (EF1.4)
0981                                    ;NO.  TERMINATE SENTENCE WITH '. ('    (EF1.4)
0982    SPEC0:  LXI     D,ENDSTR        ;APPEND PREAMBLE '. ('                 (EF1.4)
0983            CALL    SPCMOV          ;                                      (EF1.4)
0984            JMP     SPEC4           ;GO ADD PART OF SPEECH STRING          (EF1.4)
0985    SPEC1:  SUI     AENDRC          ;WAS THE PREVIOUS A PART OF SPEECH?    (EF1.4)
0986            CPI     4               ;IF NOT IN PART                        (EF1.4)
0987            JC      SPEC3           ;    OF SPEECH RANGE                   (EF1.4)
0988            CPI     13              ;         SKIP                         (EF1.4)
0989            JC      SPEC4           ;IF PART OF SPEECH SKIP                (EF1.4)
0990    SPEC3:  LXI     D,OPNSTR        ;JUST OPEN A PART OF SPEECH LIST       (EF1.4)
0991            CALL    SPCMOV          ;                                      (EF1.4)
0992    SPEC4:  POP     D               ;RESTORE THE PART OF SPEECH STRING PTR (EF1.4)
0993            CALL    SPCMOV          ;APPEND PART OF SPEECH TO STRING       (EF1.4)
0994            PUSH    H               ;PROTECT STAGING AREA PARAMS.          (EF1.4)
```

```
0995            PUSH    B                       ;                                       (EF1.4)
0996            CALL    GNXTCHR                 ;FETCH THE NEXT (ASCII) CHARACTER       (EF1.4)
0997            LXI     H,LTOA                  ;BASE OF LOCAL TO ASCII ALPHABET CONVER.(EF1.4)
0998            MOV     E,A                     ;TABLE.  BUILD INDEX OUT OF LOCAL CHAR. (EF1.4)
0999            MVI     D,0                     ;[DE] CONTAINS LOCAL CHAR               (EF1.4)
1000            DAD     D                       ;[HL] POINTS TO ITS ASCII CODE CHAR     (EF1.4)
1001            MOV     A,M                     ;FETCH THE ASCII CODE                   (EF1.4)
1002            STA     READAH                  ;SAVE IT FOR NORMAL USE                 (EF1.4)
1003            CPI     SPECODE                 ;IS IT A SPECIAL CODE?                  (EF1.4)
1004            POP     B                       ;RESTORE STAGING AREA PARAMS            (EF1.4)
1005            POP     H                       ;                                       (EF1.4)
1006            JNC     SPEC7                   ;SKIP IF NOT.                           (EF1.4)
1007            SUI     AENDRC                  ;BIAS SPECIAL CODE                      (EF1.4)
1008            ORA     A                       ;IS IT A PART OF SPEECH?                (EF1.4)
1009            CPI     4                       ;                                       (EF1.4)
1010            LXI     D,PSCONT                ;ASSUME SO, CONTINUED PART OF S. LIST   (EF1.4)
1011            JC      SPEC7                   ;SKIP IF NOT PART OF SPEECH             (EF1.4)
1012            CPI     13                      ;TEST WITHIN PART OF SPEECH RANGE       (EF1.4)
1013            JC      SPEC8                   ;IF PART OF SPEECH SKIP                 (EF1.4)
1014    SPEC7:  LXI     D,STRAIL                ;IF NOT, APPEND TRAILOR                 (EF1.4)
1015    SPEC8:  CALL    SPCMOV                  ;                                       (EF1.4)
1016            LXI     H,PSTRNG                ;LOC(STAGING AREA)                      (EF1.4)
1017            MOV     A,B                     ;LENGTH IN [A], LOC IN [HL]             (EF1.4)
1018            ORA     A                       ;CY=0                                   (EF1.4)
1019            RET                             ;   TO SHOW RETURNING STRING            (EF1.4)
1020
1021    SPEC9:  XCHG                            ;[HL] NOW POINTS TO SPECIAL STRING      (EF1.4)
1022            MOV     A,M                     ; [A] = LENGTH OF STRING (PRECEEDS STRING)
1023            INX     H                       ;[HL] POINTS TO 1ST ASCII CHAR IN STRING
1024            ORA     A                       ;SET CY=0
1025            RET                             ;RETURN CY=0, [A]=CHAR COUNT, [HL]= STRING LOC.
1026
1027    SPCMOV:                                 ;APPEND A STRING TO THE STAGING AREA    (EF1.4)
1028                                            ;ON ENTRY: [DE] STRING TO BE APPENDED   (EF1.4)
1029                                            ;          [HL] IS INDEX TO STAGING AREA (EF1.4)
1030                                            ;          [B] IS LENGTH OF STRING IN STAG. AREA(EF1.4)
1031                                            ;ON EXIT:  [B] & [HL] ARE UPDATED.      (EF1.4)
1032            LDAX    D                       ;FETCH LENGTH OF 'FROM' STRING          (EF1.4)
1033            MOV     C,A                     ;[C] = LENGTH OF MOVE, COUNTER          (EF1.4)
1034            ADD     B                       ;COMPUTE LENGTH OF NEW STRING           (EF1.4)
1035            MOV     B,A                     ; AND RETURN IT.                        (EF1.4)
1036    SPCMLP: INX     D                       ;MOVE TO NEXT CHAR IN 'FROM'            (EF1.4)
1037            LDAX    D                       ;FETCH IT                               (EF1.4)
1038            MOV     M,A                     ;OUTPUT IT TO STAGING AREA              (EF1.4)
1039            INX     H                       ;INCREMENT INDEXES                      (EF1.4)
1040            DCR     C                       ;LOOP UNTIL ITS ALL MOVED               (EF1.4)
1041            JNZ     SPCMLP                  ;                                       (EF1.4)
1042            RET                             ;                                       (EF1.4)
1043
1044    PSTRNG: DB '            '               ;STAGING AREA FOR PART OF SPEECH STRING (EF1.4)
1045    ENDSTR: DB 4,'. ('                      ;PRECEEDS 1ST PART OF SPEECH            (EF1.4)
1046    OPNSTR: DB 1,'('                        ;BEGINS INITIAL PART OF SPEECH          (EF1.4)
1047    STRAIL: DB 2,') '                       ;CLOSES PART OF SPEECH LIST             (EF1.4)
1048    PSCONT: DB 1,'@'                        ;CONTINUES PART OF SPECH LIST           (EF1.4)
1049                                            ;'@' MAPS INTO ',' NOT ', '             (EF1.4)
1050    ;-------------------------------------------------------------------
1051    ; GNXTCHR:  GET THE NEXT CHARACTER (LOCAL ALPHABET) FROM THE DATA STREAM
1052    ;           RETURN IT IN [A]
1053    ;     NOTE: REPCNT IS INITIALIZED TO 2 AND FLDSIZ TO FULCHR WHEN
1054    ;     BEGINING A NEW PHYSICAL RECORD SINCE IT ALWAYS BEGINS WITH
1055    ;     A SINGLE CHAR IN FULCHR MODE. (WE DO NOT HAVE A PREVIOUS TRANSITION
1056    ;     TABLE TO USE.)
1057    GNXTCHR:
1058            LDA     FLDSIZ                  ;ASSUMED SIZE OF NEXT FIELD     (EF1.6)
1059            LXI     H,REPCNT                ;TEST IF FIELD IS DEFINED
1060            DCR     M                       ; I. E., ANY CHARS REMAINING IN IT?
1061            JNZ     GNXTFL                  ;IF YES, JUST PICK THEM OFF 1BY1(EF1.6)
1062            CALL    GETFDF                  ;IF NO SET UP NEXT FIELD
1063                                            ;[A]=MODE                       (EF1.6)
1064            LDA     FLDSIZ                  ;FIELD SIZE
```

| | | | | |
|---|---|---|---|---|
| 1065 | | CPI | FULCHR | ;IS IT A FULL CHARACTER? (EF1.6) |
| 1066 | | JZ | GNXTFL | ;IF YES, SKIP TABLE CODE (EF1.6) |
| 1067 | | CALL | GBITS | ;GET THE CHAR INDEX IN [A] |
| 1068 | | MOV | B,A | ;[B]=CHAR FIELD VALUE (EF1.6) |
| 1069 | | LDA | CHRBIAS | ;[A]=BIAS FOR THIS TYPE OF FIELD(EF1.6) |
| 1070 | | ADD | B | ;[A]=TABLE OFFSET (EF1.6) |
| 1071 | | LHLD | CURTRS | ;BASE OF CURRENT TRANSITION TABLE |
| 1072 | | MOV | E,A | ;BUILD OFFSET |
| 1073 | | MVI | D,0 | ; |
| 1074 | | DAD | D | ;[HL] POINTS TO CHAR IN LOCAL ALPHA. |
| 1075 | | MOV | A,M | ;FETCH CHARACTER FROM TRANS. TABLE |
| 1076 | GNXTOO: | | | ;[A]=CHAR IN LOCAL ALPHABET (BIASED) |
| 1077 | | MOV | E,A | ;USE IT AS OFFSET FOR NEXT TIME |
| 1078 | | MVI | D,0 | ;CLEAR UPPER BYTE |
| 1079 | | LXI | H,TRTABS | ;BASE OF VECTOR OF TRANSITION TABLES |
| 1080 | | DAD | D | ;SET UP TABLE FOR NEXT TIME |
| 1081 | | DAD | D | ;WORD ENTRIES |
| 1082 | | MOV | E,M | ;FETCH NEW TRANSITION TABLE LOCATION |
| 1083 | | INX | H | |
| 1084 | | MOV | D,M | |
| 1085 | | XCHG | | ;IS NOT IN [HL] |
| 1086 | | SHLD | CURTRS | ;SAVE IT FOR NEXT TIME |
| 1087 | | RET | | ;[A]= CHAR IN LOCAL ALPHABET (BIASED) |
| 1088 | | | | |
| 1089 | GNXTFL: | | | ;FETCH A CHAR. [A]= WIDTH (EF1.6) |
| 1090 | | CALL | GBITS | ;FETCHS THE CHAR (LOCAL ALPHA.) |
| 1091 | | | | ;[A] = CHAR (UNBIASED) |
| 1092 | | | | ;NOTE: WE KNOW THAT FULL CHARS (EF1.6) |
| 1093 | | | | ; DO NOT HAVE A BIAS (CHRBIAS=0)(EF1.6) |
| 1094 | | DCR | A | ; NOW BIASED |
| 1095 | | JMP | GNXTOO | ; DIRECTLY FROM THE DATA STREAM |
| 1096 | ;---------------------------------------------------------------- | | | |
| 1097 | GETFDF: | | | ;GET FIELD DEFINITION & INITIALIZE ITS VALUES |
| 1098 | | | | ;(UTILIZES A 6 MODE ENVELOPE) (EF1.6) |
| 1099 | | | | ;ON EXIT: FLDSIZ IS THE SIZE OF THE CHAR FIELD (BITS) |
| 1100 | | | | ; REPCNT IS THE # OF SUCH FIELDS WHICH FOLLOW |
| 1101 | | | | ; CHRBIAS IS THE BIAS FOR THE CHAR. FLD(EF1.6) |
| 1102 | | | | |
| 1103 | | MVI | A,2 | ;GET MAJOR MODE DEF FIELD. (EF1.6) |
| 1104 | | CALL | GBITS | ;GET THE FIELD CODE FROM THE DATA STREAM |
| 1105 | | CPI | 3 | ;MODE1,MODE2,MODE3? (EF1.6) |
| 1106 | | JC | GETF01 | ;IF YES, WE HAVE THE MODE (EF1.6) |
| 1107 | | MVI | A,1 | ; OTHERWISE GET MODE SUB FIELD FLAG (EF1.6) |
| 1108 | | CALL | GBITS | ; TO SEE HOW MUCH MORE TO GET (EF1.6) |
| 1109 | | ORA | A | ;DO WE NOW HAVE IT ALL? (EF1.6) |
| 1110 | | MVI | A,3 | ;(ASSUME YES, MODE 4A) (EF1.6) |
| 1111 | | JZ | GETF01 | ;IF YES, GO SET UP PARAMETERS (EF1.6) |
| 1112 | | MVI | A,1 | ; OTHERWISE GET REMAINDER OF MODE FIELD (EF1.6) |
| 1113 | | CALL | GBITS | ; WHICH COMPLETES OUR BITTER SEARCH (EF1.6) |
| 1114 | | ADI | 4 | ;BIAS IT UP TO MODE (MODE 4B OR MODEFL) (EF1.6) |
| 1115 | GETF01: | STA | MODE | ;SAVE THE MODE (FOR DEBUGING ONLY) (EF1.6) |
| 1116 | | MOV | E,A | ;[A]=FIELD MODE. (EF1.6) |
| 1117 | | MVI | D,0 | ;[DE]=FIELD MODE AS 16 BIT QUANTITY (EF1.6) |
| 1118 | | LXI | H,FLDSZS | ; INDEX TO THE WIDTH OF A CHAR. FIELD |
| 1119 | | DAD | D | |
| 1120 | | MOV | A,M | ;[A]=BITS PER CHAR FIELD |
| 1121 | | STA | FLDSIZ | ; SAVE FOR USE WHEN FETCHING CHARS. |
| 1122 | | LXI | H,CHBIAS | ;TABLE OF CHAR BIAS VALUES (EF1.6) |
| 1123 | | DAD | D | ; INDEXED BY MODE (EF1.6) |
| 1124 | | MOV | A,M | ;[A]=BIAS ON CHAR FIELD (EF1.6) |
| 1125 | | STA | CHRBIAS | ; (EF1.6) |
| 1126 | | LXI | H,CTBIAS | ;TABLE OF MIN FIELD COUNTS (EF1.6) |
| 1127 | | DAD | D | ; INDEXED BY MODE (EF1.6) |
| 1128 | | MOV | A,M | ;FETCH MIN REPEAT COUNT (EF1.6) |
| 1129 | | STA | REPCNT | ;# OF CHARS. FLDSIZ BITS WIDE. |
| 1130 | | RET | | |
| 1131 | | | | |
| 1132 | ;---------------------------------------------------------------- | | | |
| 1133 | ;NOTE: FOR PROPER OPERATION CBITN, CBYTEN MUST BE INITIALIZED TO 1 AT THE | | | |
| 1134 | ; BEGINNING OF A NEW PHYSICAL RECORD. | | | |
| 1135 | ; AFTER WHICH EVERYTHING IS TRIGGERED BY A CALL TO GBITS. | | | |

```
1136
1137  GBITS:                          ;GET NEXT N=[A] BITS (N<7=8)
1138                                 ;BELOW [B]=BITS LEFT TO BE RETURNED
1139                                 ;      [C]=DATA BEING BUILT TO RETURN
1140                                 ;      [D]=# OF BITS OF IN-HAND DATA
1141                                 ;      [E]=DATA BITS LEFT JUSTIFIED.
1142         ORA     A               ;NOTE: 0 BIT REQUEST IS REASONABLE FOR   (EF1.6)
1143         RZ                      ;   SOME ALGORITHMS (PERFECT FIELDS)     (EF1.6)
1144         MOV     B,A             ;# OF BITS TO RETURN
1145         LDA     CBITS           ;BITS OF IN-HAND DATA REMAINING
1146         MOV     E,A             ;
1147         LDA     CBITN           ;CURRENT IN-HAND BIT (+1, ACTUALLY)
1148         MOV     D,A
1149         XRA     A               ;START BUILDING WITH 0
1150  GB00:  MOV     C,A             ;SAVE DATA BEING BUILT-UP
1151         DCR     D               ;DECREMENT IN-HAND BIT COUNTER
1152         CZ      GNXTBY          ;IF NECESSARY, GET NEXT DATA BYTE
1153         MOV     A,E             ;IN-HAND DATA
1154         RAL                     ;MOVE HIGH BIT INTO CARRY FLAG
1155         MOV     E,A             ;SAVE REMAINING BITS
1156         JC      GB02            ;IF 1 BIT SKIP
1157         MOV     A,C             ;0 BIT, INSERT 0 BIT AND LOW END
1158         ADD     A               ; BY MULTIPLYING BY 2
1159  GB01:  DCR     B               ;MORE BITS TO BE RETURNED?
1160         JNZ     GB00            ;IF YES LOOP
1161         PUSH    PSW             ;PROTECT DATA BEING RETURNED
1162         MOV     A,D             ;SAVE # OF IN-HAND BITS
1163         STA     CBITN
1164         MOV     A,E             ; & IN-HAND DATA BITS
1165         STA     CBITS
1166         POP     PSW             ;[A]=REQUESTED BITS
1167         RET
1168
1169  GB02:  MOV     A,C             ;INSERT A 1 BIT
1170         ADC     A               ;BY *2+1
1171         JMP     GB01
1172
1173  ;------------------------------------------------------------
1174  GNXTBY:                         ;GET NEXT DATA BYTE. RETURN IT IN [E]
1175         PUSH    B               ;PROTECT REGISTER
1176         LXI     H,CBYTEN        ;DECREMENT BYTE COUNTER
1177         DCR     M               ;
1178         CZ      GNXTREC         ;GET ANOTHER RECORD IF NECESSARY
1179         LHLD    BUFINX          ;INDEX TO BYTE IN READ BUFFER
1180         MOV     A,M             ;FETCH BYTE FROM BUFFER
1181         INX     H
1182         SHLD    BUFINX          ;SAVE THE BUFFER INDEX
1183         POP     B               ;
1184         MOV     E,A             ;[E]=DATA BYTE
1185         MVI     D,8             ;[D]=# OF BITS
1186         RET
1187
1188  ;------------------------------------------------------------
1189  GNXTREC:                        ;GET THE NEXT PHYSICAL RECORD
1190         LHLD    RECNUMB         ;UPDATE THE FCB RECORD FIELD TO NEXT REC.
1191         INX     H               ;+1 FOR NEXT RECORD
1192         SHLD    RECNUMB         ;SAVE NEW NUMBER
1193         XCHG                    ;
1194         LHLD    FCBREC          ;LOC(FCB R1,R2 FIELD)
1195         MOV     M,E             ;SET R1
1196         INX     H
1197         MOV     M,D             ;SET R2.  COMPLETES  RECORD NUMBER IN FCB
1198         LXI     D,DMAADR        ;SET DMA ADDRESS                    (EF1.2)
1199         MVI     C,SETDMA        ;TO BUFFER                          (EF1.2)
1200         CALL    BDOS            ;                                   (EF1.2)
1201         LHLD    FCBLOC          ;NOW READ THE RECORD.
1202         XCHG                    ;[DE]=LOC(FCB)
1203         MVI     C,RRDFC         ;RANDOM READ FUNC.
1204         CALL    BDOS            ;
1205         XRA     A               ;SUCCESSFUL?
1206         CNZ     INTERR          ;NO.. YOU AND I KNOW IT CAN NEVER HAPPEN. (HA.)
```

```
1207            MVI     A,128           ;RESET POINTERS
1208            STA     CBYTEN          ;BYTES IN BUFFER
1209            LXI     H,DMAADR        ;RESET INDEX TO BOTTOM OF INPUT BUFFER.
1210            SHLD    BUFINX          ;
1211            RET                     ;RETURN TO CALLER
1212
1213    ;--------------------------------------------------------------------
1214    ; INTERNAL UTILITY SUBROUTINES.
1215    ;
1216
1217    SUBDEHL:                        ;SUBTRACT [DE] FROM [HL], RESULT IN [BC]
1218                                    ;UPON EXIT CY=1, IF [HL]    [DE]
1219                                    ;Z=1 IF THEY ARE EQUAL.
1220            MOV     A,L             ;SUBTRACT LOWER BYTES.
1221            SUB     E
1222            MOV     C,A             ;SAVE RESULT IN [C]
1223            MOV     A,H             ;SUBTRACT UPPER BYTES AND CARRY
1224            SBB     D
1225            MOV     B,A
1226            RNZ                     ;RETURN IF NOT =
1227            ORA     C
1228            RET                     ;COMPLETE ZERO TEST
1229
1230    CMPDEHL:                        ;COMPARE [DE] TO [HL]
1231                                    ;UPON EXIT CY=1, IF [HL]    [DE]
1232                                    ;Z=1 IF THEY ARE EQUAL.
1233            PUSH    B               ;NEED A REG
1234            CALL    SUBDEHL         ;SUBTRACT THEM
1235            POP     B               ;RESTORE [BC]
1236            RET
1237
1238    ADDDEHL:                        ;ADD [DE] TO [HL], RESULT IN [BC]
1239            MOV     A,L             ;ADD LOWER BYTES.
1240            ADD     E
1241            MOV     C,A             ;SAVE RESULT IN [C]
1242            MOV     A,H             ;ADD UPPER BYTES
1243            ADC     D               ;ADD IN POSSIBLE CARRY BIT
1244            MOV     B,A             ;SAVE RESULT
1245            RET                     ;
1246
1247    CMPBCDE:                        ;COMPARE [BC] TO [DE]
1248                                    ;UPON EXIT CY=1, IF [DE] < [BC]
1249                                    ;Z=1 IF THEY ARE EQUAL.
1250            PUSH    H               ;NEED A REG.
1251            MOV     A,E             ;SUBTRACT LOWER BYTES.
1252            SUB     C
1253            MOV     L,A             ;SAVE RESULT
1254            MOV     A,D             ;SUBTRACT UPPER BYTES AND CARRY
1255            SBB     B
1256            JNZ     CMPBC1          ;SKIP IF NO POSSIBLE ZERO
1257            ORA     L               ;TEST FOR ZERO IN BOTH BYTES
1258
1259    CMPBC1: POP     H               ;RESTORE REG
1260            RET
1261    ;--------------------------------------------------------------------
1262    STRCMP:                         ;COMPARE THE STRINGS AT LOC([HL] & LOC([DE])
1263                                    ;Z, ==> THEY MATCH,
1264                                    ;Z=1,CY=0, NO MATCH & ([DE])>([HL]) LEX. ORDER.
1265                                    ;Z=1,CY=1, NO MATCH & ([DE])<([HL]) LEX. ORDER.
1266            RET
1267    ;--------------------------------------------------------------------
1268    ; INTERR:         COMES HERE BY CALL WHEN AN INTERNAL ERROR HAS OCCURRED.
1269    ;                 THE CALL ALLOWS US TO DETERMINE THE ADDRESS OF THE OFFENCE.
1270    INTERR: SHLD    BMBHL           ;SAVE REGS.
1271            XCHG                    ;
1272            SHLD    BMBDE
1273            MOV     H,B
1274            MOV     L,C
1275            SHLD    BMBDE
1276            STA     BMBA
```

```
1277            POP     H                       ;OBTAIN LOCATION WHERE WE BOMBED OUT
1278            SHLD    ERRLOC                  ;PUT IT INTO A KNOWN ADDRESS.
1279            JMP     000                     ;RETURN TO THE OS.
1280            DB      'Bombed out at --->'    ;MAKE IT EASY TO FIND.
1281    ERRLOC: DW      0                       ;LOC(CALL INTERR)
1282    BMBHL:  DW      0                       ;REGISTERS AT TIME OF ERROR
1283    BMBDE:  DW      0                       ;
1284    BMBBC:  DW      0                       ;
1285    BMBA:   DW      0                       ;
1286
1287    ;----------------------------------------------------------------
1288    ;       DATA AREA FOR THESAURUS DATA BASE DRIVER
1289    ;
1290    ;----------------------------------------------------------------
1291    CFLAG2: DB      02                      ;IDENTIFIES THE COMPRESSION ALGORITHM    (EF1.6)
1292    CFLAG3: DB      01                      ;IDENTIFIES COMPATIBILITY REQUIREMENT    (EF1.5)
1293                                            ;OF ALL FEATURES OTHER THAN COMPRESSION (EF1.5)
1294                                            ;& ALPHABET (CFLAG2, CFLAG1 RESPECTIVELY)(EF1.5)
1295
1296
1297    MIN1CT  EQU     1                       ;BIAS FOR 0 IN 1 BIT REPEAT COUNT       (EF1.6)
1298    MIN2CT  EQU     1                       ;BIAS FOR 0 IN 2 BIT REPEAT COUNT
1299    MIN3CT  EQU     1                       ;BIAS FOR 0 IN 3 BIT REPEAT COUNT
1300    MIN4CT  EQU     1                       ;BIAS FOR 0 IN 4 BIT REPEAT COUNT
1301    MINXCT  EQU     1                       ;BIAS FOR 0 IN FULCHR REPEAT COUNT.
1302
1303    CHBIAS:                                  ;BIAS WHICH MUST BE ADDED TO CHAR FIELD (EF1.6)
1304            DB      0                       ;1-BIT                                   (EF1.6)
1305            DB      2                       ;2-BIT                                   (EF1.6)
1306            DB      4                       ;3-BIT                                   (EF1.6)
1307            DB      8                       ;4-BIT A                                 (EF1.6)
1308            DB      12                      ;4-BIT B                                 (EF1.6)
1309            DB      0                       ;FULL CHAR FIELD                         (EF1.6)
1310    CTBIAS:                                  ;MEANING OF 0 IN COUNT FIELD (BIAS)
1311            DB      MIN1CT                  ;1-BIT FIELD MIN. REPEAT COUNT           (EF1.6)
1312            DB      MIN2CT                  ;2-BIT FIELD MIN. REPEAT COUNT
1313            DB      MIN3CT                  ;3-BIT FIELD MIN. REPEAT COUNT
1314            DB      MIN4CT                  ;4-BIT A FIELD MIN. REPEAT COUNT         (EF1.6)
1315            DB      MIN4CT                  ;4-BIT B FIELD MIN. REPEAT COUNT         (EF1.6)
1316            DB      MINXCT                  ;FULL CHAR. MIN. REPEAT COUNT
1317    FLDSZS:                                  ;WIDTH OF CHAR FIELDS
1318            DB      1                       ;1 BIT MODE                              (EF1.6)
1319            DB      1                       ;2 BIT MODE                              (EF1.6)
1320            DB      2                       ;3 BIT MODE                              (EF1.6)
1321            DB      2                       ;4 BIT A MODE                            (EF1.6)
1322            DB      2                       ;4 BIT B MODE                            (EF1.6)
1323            DB      FULCHR                  ;FULL CHAR MODE
1324
1325    DATAIN: DB      00                      ;=0FFH IF AN ENTRY HAS BEEN SET UP.
1326    FLDSIZ: DB      FULCHR                  ;WIDTH OF A CHAR FIELD
1327    CHRBIAS:DB      0                       ;MODE DEPENDENT BIAS FOR CHAR. FIELD     (EF1.6)
1328    REPCNT: DB      2                       ;# OF CHARS IN STREAM
1329    MODE:   DB      0                       ;HOLDS MODE (DEBUGGING PURPOSES ONLY)    (EF1.6)
1330    SPCODE: DB      0                       ;NON-ZERO ==> NEXT CHAR COMES FROM SPECIAL
1331                                            ; STRING & COUNT OF CHARS IS IN SPECOD
1332    LOCSPC: DW      0                       ; & LOCSPC CONTAINS THE INDEX TO ITS NEXT CHAR.
1333    CBYTEN: DB      1                       ;# (+1) OF BYTES OF DATA IN CUR. READ BUFFER
1334    CBITS:  DB      0                       ;IN-HAND DATA BITS LEFT JUSTIFIED
1335    CBITN:  DB      1                       ;# (+1) OF IN-HAND DATA BITS
1336    CURTRS: DW      0                       ;CURRENT TRANS TABLE ADDRESS.
1337    LOCTRN: DW      0                       ;LOC(CHAR TRANSITION TABLE FOR LAST CHAR)
1338    BUFINX: DW      0                       ;INDEX INTO READ BUFFER
1339    PREVC:  DB      0                       ;PREVIOUS (UNEXPANDED) CHARACTER
1340    INHAND: DB      0                       ;IN HAND (UNEXPANDED) CHARACTER
1341    SEP:    DB      0                       ;INDEX OR DATA ENTRY SEPARATOR IN LOCAL ALPA.
1342
1343    MAXENT: DW      0                       ;HIGHEST ENTRY # IS PICKED FROM FILE HEADER.
1344    ENTRYN: DW      0                       ;CURRENT ENTRY #
1345    DMAADR: DS      128                     ;OUR DISK I/O BUFFER
1346    ;   IIXWRD:DS    MAXIWD                  ; INTERNAL LOC. FOR INDEX WORD WHEN      (EF1.6)
1347    INITED: DB      0FFH                    ;ZERO IF INITIALIZATION HAS OCCURRED.
```

```
1348  READAH: DB      0FFH                    ;0FFH IF NO READ-AHEAD CHAR. IS WAITING (EF1.4)
1349                                          ; OTHERWISE IT CONTAINS THE CHARACTER    (EF1.4)
1350  FCBLOC: DW      0                       ;USER SUPPLIED FCB ADDRESS
1351  FCBREC: DW      0                       ;LOC(FCB RECORD NUMBER FIELD (R1,R2))
1352  RECNUMB:DW      0                       ;PHYSICAL RECORD NUMBER IN DATA FILE.
1353  LOCBUF: DW      0                       ;USER SUPPLIED BUFFER ADDRESS
1354  BUFLEN: DW      0                       ;USER SUPPLIED LENGTH OF ABOVE BUFFER
1355  RECTAB: DW      0                       ;POINTS TO APPROPRIATE RECORD TABLE
1356  BYTABL: DW      0                       ;POINTS TO TABLE OF BYTE OFFSETS FOR THE ABOVE
1357  LRNT2:  DW      0                       ;OFFSET INTO LOGICAL RECORD TABLES.
1358  FSTENT: DW      0                       ;# OF FIRST ENTRY IN CURRENT LOGICAL RECORD
1359  USRSTR: DW      0                       ;LOC(USERS INDEX WORD)
1360  TAB:    DB      0                       ;0FFH IF NO TAB, OTHERWISE TAB OFFSET    (EF1.3)
1361  ;-----------------------------------------------------------------------------
1362  ; THE SPECIAL TABLE CONTAINS POINTERS TO THE ASCII STRINGS REPRESENTED
1363  ; BY THE SPECIAL CODES USED IN THE DATA BASE.  THE FIRST BYTE OF SUCH
1364  ; A STRING CONTAINS THE COUNT OF ASCII CHARACTERS WHICH FOLLOW.
1365
1366  SPECIAL:                        ;
1367          DW      CODE1,CODE2,CODE3,CODE4,CODE5   ;                       (EF1.4)
1368          DW      CODE6,CODE7,CODE8,CODE9,CODEA   ;                       (EF1.4)
1369          DW      CODEB,CODEC,CODED,CODEE,CODEF   ;                       (EF1.4)
1370  ; STRINGS FOR SPECIAL CODES GO HERE.
1371  CODE1:  DB      1,18            ;END OF LOGICAL RECORD MAPS INTO ITSELF.
1372  CODE2:  DB      9,'(plural) ' ;                                         (EF1.4)
1373  CODE3:  DB      11,'(informal) ';                                       (EF1.4)
1374  CODE4:  DB      8,'(slang) '    ;1 special string                       (EF1.3)
1375  CODE5:  DB      5,'pron.'       ;pronoun                                (EF1.4)
1376  CODE6:  DB      3,'pp.'         ;past participle                        (EF1.4)
1377  CODE7:  DB      10,'. (Ant.) '
1378  CODE8:  DB      2,'v.'          ;                                       (EF1.4)
1379  CODE9:  DB      4,'adj.'        ;                                       (EF1.4)
1380  CODEA:  DB      2,'n.'          ;                                       (EF1.4)
1381  CODEB:  DB      5,'prep.'       ;                                       (EF1.4)
1382  CODEC:  DB      4,'adv.'        ;                                       (EF1.4)
1383  CODED:  DB      5,'conj.'       ;                                       (EF1.4)
1384  CODEE:  DB      4,'. ',EODFLG   ;end of list (1)
1385  CODEF:  DB      4,'. ',EODFLG   ;end of list (2)
1386          END
1387
```

APPENDIX B                                              THET120.MAC

```
0001  ;-----------------------------------------------------------------------
0002  ;       TABLES REQUIRED BY THE THESAURUS DRIVER.
0003  ;       MUST BE IN THE ORDER BELOW AND ALWAYS THE SAME SIZE
0004  ;       120K VERSION 1.1 Thesaurus of 10/14/82 (EF)
0005
0006          ENTRY   INXKEY,INXBND,INXREC,ENTREC,BYTES,LTOA,TRTABS,TABBEG
0007          ENTRY   LLOAD,PVERL,CFLAG1
0008          ENTRY   IIXWRD          ;USE SCRAT SPACE BELOW, MUST BE 40 BYTES
0009
0010  ;-----------------------------------------------------------------------
0011  ; DECOMPRESSION TABLES.
0012  ;
0013  ; description: The local alphabet names the symbols as numbers 1 to LENALP.
0014  ;       The table LTOA maps a local symbol into its ASCII code or special
0015  ;       code (usually maps into a string of ASCII characters).
0016  ;
0017  ;       The table TRTABS contains the address of tables for each local
0018  ;       symbol (S).  Thus, TRTABS + 2*S (16 bit entries) is the address
0019  ;       of the transition table for S.  Following whatever defines S in
0020  ;       the data stream is a field which will either contain an offset
0021  ;       into S's table (0 TO 15) which contains the next symbol, or the
0022  ;       symbol itself.  All such symbols are in the local alphabet.
0023  ;
0024  ;
```

```
0025  ;     The database consists of two parts: the index list, and the entry
0026  ;     data list.  There is a 1 to 1 correspondence between the two lists.
0027  ;     The data is arranged into 160 logical records which vary in size.
0028  ;     The last symbol in each record is an end-of-record mark.  Both lists
0029  ;     are compressed/decompressed via the same alogrithm.  The tables
0030  ;     INXREC and ENTREC with BYTES define the boundaries of the logial
0031  ;     records for the index data and entry data, repectively.  The
0032  ;     boundaries are defined by relative physical record # and byte #
0033  ;     (0-127).
0034  ;----------------------------------------------------------
0035
0036
0037
0038
0039
0040  LTOA:   ; LOCAL TO ASCII TRANSLATION TABLE
0041    DB 065H,02CH,069H,074H,061H,06EH,072H,073H,06FH,06CH,063H,075H
0042    DB 064H,070H,06DH,067H,066H,068H,062H,079H,076H,01FH,077H,01BH
0043    DB 06BH,019H,020H,01AH,078H,071H,06AH,07AH,02DH,01DH,014H,015H
0044    DB 01CH,029H,028H,013H,01EH,027H,016H,022H,012H
0045
0046  TRTABS:    ; TABLE OF TRANSITITION TABLE LOCATIONS.
0047    DW TRAN01,TRAN02,TRAN03,TRAN04,TRAN05,TRAN06,TRAN07,TRAN08
0048    DW TRAN09,TRAN10,TRAN11,TRAN12,TRAN13,TRAN14,TRAN15,TRAN16
0049    DW TRAN17,TRAN18,TRAN19,TRAN20,TRAN21,TRAN22,TRAN23,TRAN24
0050    DW TRAN25,TRAN26,TRAN27,TRAN28,TRAN29,TRAN30,TRAN31,TRAN32
0051    DW TRAN33,TRAN34,TRAN35,TRAN36,TRAN37,TRAN38,TRAN39,TRAN40
0052    DW TRAN41,TRAN42,TRAN43,TRAN44,TRAN45
0053
0054  TRAN01:    ; LOCAL CHAR 01
0055    DB 001H,006H,005H,007H,00CH,004H,00AH,009H,003H,00EH,015H,01CH
0056    DB 000H,00DH,014H,010H
0057  TRAN02:    ; LOCAL CHAR 02
0058    DB 007H,00AH,00CH,00DH,004H,006H,002H,000H,010H,003H,00BH,00EH
0059    DB 012H,011H,009H,008H
0060  TRAN03:    ; LOCAL CHAR 03
0061    DB 005H,008H,007H,003H,00AH,009H,00EH,014H,00FH,00CH,006H,004H
0062    DB 000H,010H,012H,00DH
0063  TRAN04:    ; LOCAL CHAR 04
0064    DB 000H,001H,002H,006H,004H,011H,013H,008H,00BH,015H,003H,009H
0065    DB 01AH,00AH,010H,019H
0066  TRAN05:    ; LOCAL CHAR 05
0067    DB 003H,005H,006H,009H,007H,00AH,012H,002H,00CH,00FH,00DH,00EH
0068    DB 014H,00BH,018H,013H
0069  TRAN06:    ; LOCAL CHAR 06
0070    DB 003H,001H,00FH,000H,00CH,00AH,007H,004H,002H,008H,010H,015H
0071    DB 005H,00BH,014H,018H
0072  TRAN07:    ; LOCAL CHAR 07
0073    DB 000H,004H,002H,008H,001H,003H,00BH,013H,006H,00CH,00EH,007H
0074    DB 005H,00AH,00FH,015H
0075  TRAN08:    ; LOCAL CHAR 08
0076    DB 003H,000H,001H,007H,002H,011H,00BH,00DH,00AH,008H,004H,015H
0077    DB 009H,00EH,013H,018H
0078  TRAN09:    ; LOCAL CHAR 09
0079    DB 005H,006H,00BH,00EH,009H,007H,003H,016H,00DH,014H,00AH,008H
0080    DB 00CH,012H,010H,002H
0081  TRAN10:    ; LOCAL CHAR 10
0082    DB 000H,002H,001H,004H,009H,008H,013H,00BH,003H,00CH,015H,010H
0083    DB 01AH,007H,020H,00EH
0084  TRAN11:    ; LOCAL CHAR 11
0085    DB 008H,000H,003H,004H,011H,002H,00BH,009H,006H,018H,00AH,001H
0086    DB 013H,015H,01DH,007H
0087  TRAN12:    ; LOCAL CHAR 12
0088    DB 005H,007H,006H,009H,003H,002H,00DH,000H,00EH,004H,00AH,00CH
0089    DB 012H,00FH,008H,010H
0090  TRAN13:    ; LOCAL CHAR 13
0091    DB 001H,000H,002H,00BH,004H,008H,015H,006H,009H,013H,00FH,01AH
0092    DB 00CH,014H,007H,005H
0093  TRAN14:    ; LOCAL CHAR 14
0094    DB 006H,000H,008H,004H,009H,00DH,002H,001H,00BH,003H,011H,013H
0095    DB 015H,007H,01AH,017H
```

```
0096    TRAN15:         ; LOCAL CHAR 15
0097      DB 000H,004H,00DH,002H,008H,001H,00EH,012H,00BH,015H,013H,005H
0098      DB 007H,010H,009H,019H
0099    TRAN16:         ; LOCAL CHAR 16
0100      DB 001H,000H,006H,004H,011H,00BH,002H,005H,009H,008H,015H,00FH
0101      DB 00EH,01AH,013H,007H
0102    TRAN17:         ; LOCAL CHAR 17
0103      DB 002H,00BH,000H,008H,004H,010H,009H,006H,001H,013H,003H,020H
0104      DB 01AH,015H,007H,017H
0105    TRAN18:         ; LOCAL CHAR 18
0106      DB 000H,004H,001H,008H,002H,003H,00BH,006H,013H,015H,010H,00EH
0107      DB 009H,01AH,017H,016H
0108    TRAN19:         ; LOCAL CHAR 19
0109      DB 009H,000H,004H,006H,008H,002H,00BH,007H,001H,012H,01EH,003H
0110      DB 013H,00CH,014H,00EH
0111    TRAN20:         ; LOCAL CHAR 20
0112      DB 001H,015H,002H,01AH,00EH,000H,007H,004H,019H,00DH,008H,017H
0113      DB 01BH,009H,006H,005H
0114    TRAN21:         ; LOCAL CHAR 21
0115      DB 000H,002H,004H,008H,00BH,013H
0116    TRAN22:         ; LOCAL CHAR 22
0117      DB 017H,01BH,019H,02CH,021H,024H,028H,02AH
0118    TRAN23:         ; LOCAL CHAR 23
0119      DB 004H,002H,000H,001H,008H,005H,011H,006H,00CH,009H,015H,01AH
0120      DB 010H,013H,007H,018H
0121    TRAN24:         ; LOCAL CHAR 24
0122      DB 007H,00AH,00DH,004H,00CH,006H,000H,012H,00EH,002H,010H,003H
0123      DB 011H,008H,00FH,009H
0124    TRAN25:         ; LOCAL CHAR 25
0125      DB 001H,000H,002H,005H,015H,009H,01AH,013H,004H,017H,007H,008H
0126      DB 016H,019H,00EH,020H
0127    TRAN26:         ; LOCAL CHAR 26
0128      DB 007H,00AH,00CH,006H,004H,017H,00DH,000H,012H,002H,010H,00EH
0129      DB 003H,00FH,009H,008H
0130    TRAN27:         ; LOCAL CHAR 27
0131      DB 008H,003H,004H,010H,00BH,012H,00DH,016H,007H,00CH,00AH,002H
0132      DB 00EH,006H,000H,00FH
0133    TRAN28:         ; LOCAL CHAR 28
0134      DB 007H,00BH,00AH,002H,00DH,010H,004H,00CH,000H,006H,00EH,012H
0135      DB 011H,009H,003H,016H
0136    TRAN29:         ; LOCAL CHAR 29
0137      DB 00DH,003H,00AH,004H,002H,000H,001H,011H,00BH,008H,015H,01DH
0138      DB 013H,017H,01AH,019H
0139    TRAN30:         ; LOCAL CHAR 30
0140      DB 00BH
0141    TRAN31:         ; LOCAL CHAR 31
0142      DB 00BH,000H,008H,004H,002H
0143    TRAN32:         ; LOCAL CHAR 32
0144      DB 000H,004H,01FH,002H,009H,013H,00BH,008H,015H,014H,017H
0145    TRAN33:         ; LOCAL CHAR 33
0146      DB 007H,00EH,003H,011H,012H,00CH,010H,00AH,006H,016H,00DH,009H
0147      DB 008H,004H,002H,000H
0148    TRAN34:         ; LOCAL CHAR 34
0149      DB 004H,002H,007H,010H,008H,000H,00AH,005H,012H,00CH,00BH,024H
0150      DB 00EH,00DH,009H,006H
0151    TRAN35:         ; LOCAL CHAR 35
0152      DB 007H,00AH,00EH,004H,00DH,012H,016H,011H,00BH,008H,006H,003H
0153      DB 002H,000H,010H,00CH
0154    TRAN36:         ; LOCAL CHAR 36
0155      DB 00AH,012H,00CH,00DH,007H,011H,006H,00FH,01EH,013H,010H,009H
0156      DB 00EH,000H,018H,016H
0157    TRAN37:         ; LOCAL CHAR 37
0158      DB 004H,012H,002H,021H,016H,00AH,008H,007H,005H,000H,028H,022H
0159      DB 011H,010H,00EH,00CH
0160    TRAN38:         ; LOCAL CHAR 38
0161      DB 01AH,001H,019H,015H
0162    TRAN39:         ; LOCAL CHAR 39
0163      DB 00DH,00EH,00AH,007H,012H,011H,010H,009H,008H,004H,000H
0164    TRAN40:         ; LOCAL CHAR 40
0165      DB 010H,00AH,009H,006H,016H,012H,011H,00FH,00DH,005H,004H,002H
0166      DB 000H
```

```
0167 TRAN41:         ; LOCAL CHAR 41
0168   DB 004H,002H,012H,000H,024H,011H,00CH,00BH,007H,003H
0169 TRAN42:         ; LOCAL CHAR 42
0170   DB 007H,003H
0171 TRAN43:         ; LOCAL CHAR 43
0172   DB 004H,00EH,008H,005H,003H
0173 TRAN44:         ; LOCAL CHAR 44
0174   DB 001H,000H
0175 TRAN45:         ; LOCAL CHAR 45
0176   DB 01BH,017H,019H,021H,028H
0177 ;-----------------------------------------------------------------
0178 ;      LOAD PARAMETERS
0179 CFLAG1: DB      01                      ;DEFINES THE ALPHABET
0180 LLOAD:  DB      (TABEND-TABBEG+127)/128 ;LENGTH OF TABLES IN CP/M RECORDS
0181
0182 ;-----------------------------------------------------------------
0183 ; PRELOADED TABLES:  LOADED FROM THE FILE IF THEY DO NOT MATCH THOSE
0184 ;                    IN THE TABLE.
0185 ;       THE TABLES BELOW MUST MAINTAIN THERE EXACT UNLESS THE COMPATIBILITY
0186 ;       BITS ARE CHANGED, IN WHICH CASE A NEW DRIVER IS REQUIRED.
0187 ;       THE TABLE IS 13 CP/M RECORDS LONG.
0188 ;-----------------------------------------------------------------
0189 TABBEG: DB '=== '                ;MARKS THE START OF THE LOADABLE TABLE
0190 PVERL:  DW      0004             ;DEFINES THE THE VERSION OF THE THESAURUS
0191                                  ;I. E., IF IT DOESNT MATCH THE ONE IN THE FILE
0192                                  ;AND EVERYTHING ELSE IS COMPATIBLE, THE TABLES
0193                                  ;BELOW ARE LOADED FROM THE FILE.
0194
0195 ;-----------------------------------------------------------------
0196 ; THE FOLLOWING TABLES DESCRIBE THE LOGICAL RECORDS.  THEY ARE EITHER
0197 ; INDEXED BY LOGICAL RECORD NUMBER OR USED TO DETERMINE THE LOGICAL
0198 ; RECORD NUMBER.
0199
0200         DW      00000H           ;MUST PRECEDE INXKEY TABLE
0201 INXKEY:                          ;WORD TABLE WHICH CONTAINS THE FIRST 3 CHARS (IN
0202                                  ;COMPRESSED FORM - 5 BITS PER CHAR. ALL LEFT ADJ.)
0203                                  ;OF THE 1ST INDEX ENTRY OF THE
0204                                  ;CORRESPONDING RECORD.  NOTE:  CHAR. 3 ALWAYS CHANGES
0205                                  ;ACROSS A RECORD (LOGICAL, NOT PHYSICAL) BOUNDARY.
0206
0207         DW      00062H,00080H,00094H,000D8H,0014AH,0019CH,002D8H,0031EH
0208         DW      003C0H,003E6H,00484H,004A6H,00526H,00802H,00824H,0090CH
0209         DW      00926H,00AC8H,00B90H,00C48H,00C68H,01018H,01024H,01122H
0210         DW      011C8H,012C0H,012E8H,0139AH,0139CH,013AAH,0145CH,01524H
0211         DW      0182CH,01906H,01918H,01926H,01A0CH,01A2AH,01C40H,01D22H
0212         DW      0214AH,02310H,02348H,02368H,024C8H,025C8H,025E0H,02804H
0213         DW      02818H,02900H,02A16H,02AD0H,02BA4H,02C50H,02D26H,03124H
0214         DW      032E8H,03448H,03510H,03824H,03910H,03B80H,03BA8H,040D0H
0215         DW      0431EH,04340H,04346H,0434AH,04352H,04366H,04368H,04496H
0216         DW      04D18H,05802H,05832H,05A02H,05A26H,05B9CH,05D06H,06010H
0217         DW      0601EH,0602EH,06116H,06124H,0622EH,0639CH,06522H,06828H
0218         DW      0692CH,06BA8H,07066H,07280H,073DEH,0744CH,07548H,07816H
0219         DW      07824H,07900H,07922H,07924H,07A1AH,07AC8H,07B98H,07BA8H
0220         DW      07C50H,07C68H,08508H,08818H,08900H,08906H,0890EH,0891AH
0221         DW      08920H,08926H,08A04H,08A2AH,08BAAH,09006H,09026H,0909CH
0222         DW      09106H,0911EH,0912EH,091D0H,091F0H,0921EH,092DCH,09380H
0223         DW      0939EH,093CEH,093E8H,094C8H,094E2H,094E8H,09504H,09522H
0224         DW      09588H,09810H,09900H,09922H,099DCH,09B80H,09C40H,09C48H
0225         DW      09C70H,0A342H,0A348H,0A352H,0A364H,0A370H,0A80CH,0A922H
0226         DW      0AA0CH,0AA2AH,0B01AH,0B100H,0B1DCH,0B388H,0B45CH,0FFFFH
0227
0228         DW      00000H           ;MUST PRECEDE INXBND TABLE
0229 INXBND:                          ;WORD TABLE WHICH MAPS ENTRY #S INTO REL. RECORD #S
0230                                  ;EACH TABLE ITEM IS THE MAX. ENTRY # IN THE RECORD.
0231
0232         DW      0020,0038,0060,0083,0109,0133,0157,0182
0233         DW      0206,0234,0259,0287,0311,0332,0352,0371
0234         DW      0396,0420,0441,0468,0486,0516,0538,0559
0235         DW      0581,0603,0622,0693,0795,0824,0848,0867
0236         DW      0888,0919,0955,0992,1023,1110,1134,1157
0237         DW      1183,1207,1232,1263,1292,1329,1366,1389
```

```
0238        DW      1410,1430,1456,1479,1523,1542,1567,1596
0239        DW      1620,1645,1668,1703,1726,1750,1774,1803
0240        DW      1830,1865,1897,1922,1948,1989,2026,2054
0241        DW      2078,2104,2132,2159,2183,2212,2232,2256
0242        DW      2290,2311,2330,2354,2391,2419,2444,2469
0243        DW      2492,2520,2558,2580,2602,2625,2651,2677
0244        DW      2716,2736,2761,2806,2834,2858,2887,2908
0245        DW      2965,3046,3078,3100,3124,3168,3196,3232
0246        DW      3264,3301,3326,3345,3368,3387,3412,3438
0247        DW      3465,3499,3519,3539,3566,3589,3619,3643
0248        DW      3666,3696,3717,3763,3794,3822,3848,3878
0249        DW      3902,3928,3950,3973,4000,4024,4050,4077
0250        DW      4100,4126,4148,4177,4199,4224,4247,4277
0251        DW      4299,4324,4350,4370,4394,4421,4445,4461
0252
0253
0254 INXREC:   ; PHYSICAL RECORD #S FOR INX     RECORDS
0255    DW    0015,0015,0015,0016,0016,0017,0018,0018,0019,0019,0020,0020
0256    DW    0021,0022,0022,0023,0023,0023,0024,0024,0025,0025,0026,0026
0257    DW    0027,0027,0027,0028,0029,0031,0032,0033,0033,0033,0034,0035
0258    DW    0035,0036,0038,0039,0039,0040,0040,0041,0042,0042,0043,0044
0259    DW    0045,0045,0045,0046,0046,0047,0048,0048,0049,0049,0050,0050
0260    DW    0051,0051,0052,0052,0053,0053,0054,0055,0056,0056,0057,0058
0261    DW    0059,0059,0060,0060,0061,0061,0062,0062,0063,0064,0064,0064
0262    DW    0065,0066,0066,0067,0067,0068,0069,0069,0070,0070,0071,0072
0263    DW    0072,0073,0073,0074,0075,0076,0076,0077,0077,0078,0080,0081
0264    DW    0081,0082,0082,0083,0084,0085,0085,0086,0086,0087,0087,0088
0265    DW    0088,0089,0089,0090,0090,0091,0091,0092,0092,0093,0093,0094
0266    DW    0094,0095,0096,0096,0097,0097,0098,0099,0099,0100,0100,0101
0267    DW    0101,0102,0102,0103,0104,0105,0105,0106,0106,0107,0107,0108
0268    DW    0108,0109,0109,0110
0269
0270 ENTREC:   ; PHYSICAL RECORD #S FOR ENT     RECORDS
0271    DW    0111,0115,0120,0124,0129,0135,0139,0144,0148,0153,0158,0163
0272    DW    0168,0172,0177,0182,0186,0190,0195,0200,0205,0209,0215,0220
0273    DW    0224,0228,0233,0238,0251,0269,0275,0279,0283,0288,0293,0300
0274    DW    0306,0311,0327,0331,0336,0340,0344,0348,0353,0358,0365,0372
0275    DW    0376,0380,0384,0389,0393,0401,0406,0410,0415,0420,0426,0430
0276    DW    0436,0440,0444,0449,0454,0459,0465,0471,0475,0480,0487,0493
0277    DW    0498,0502,0507,0511,0516,0520,0525,0529,0534,0540,0544,0549
0278    DW    0553,0560,0565,0570,0574,0579,0584,0591,0595,0600,0604,0609
0279    DW    0613,0621,0625,0629,0637,0642,0647,0652,0656,0666,0680,0685
0280    DW    0690,0694,0702,0707,0713,0719,0725,0730,0734,0738,0742,0747
0281    DW    0751,0755,0762,0766,0771,0775,0780,0785,0789,0793,0799,0804
0282    DW    0813,0820,0825,0830,0835,0840,0844,0849,0853,0858,0862,0866
0283    DW    0871,0876,0882,0886,0891,0895,0900,0905,0910,0914,0918,0922
0284    DW    0927,0932,0937,0942
0285
0286
0287 BYTES:   ; BYTE OFFSETS - LEFT IS ENTRY, RIGHT IS INDEX
0288    DW  00000H,04A3FH,01373H,04437H,0567AH,01247H,05A0CH,01A48H
0289    DW  07F16H,01E61H,05F33H,03C7AH,04549H,07117H,02358H,03605H
0290    DW  01333H,03974H,0512EH,0085DH,0121BH,06C4AH,02B12H,0044AH
0291    DW  03204H,07B3DH,02D78H,03F28H,01960H,05375H,03A46H,05505H
0292    DW  07133H,0276BH,06835H,01214H,02F7EH,02855H,04E64H,06626H
0293    DW  0165FH,04E25H,04F73H,0593CH,04C18H,04577H,0325AH,02546H
0294    DW  0370EH,0553FH,07E70H,04032H,05267H,07651H,02006H,0414BH
0295    DW  06216H,01452H,00312H,01247H,0431FH,05E52H,07A0DH,02944H
0296    DW  0240EH,0175FH,03841H,01132H,04B15H,00566H,0205CH,0454AH
0297    DW  02024H,05369H,01B2BH,06671H,03436H,07773H,05C38H,07B64H
0298    DW  02C29H,03F08H,0723EH,02475H,03634H,03B26H,04F6DH,00C2CH
0299    DW  0496DH,00932H,07D00H,0437BH,07535H,03172H,05D32H,0380AH
0300    DW  07B52H,0293DH,02E6FH,0433EH,0424BH,01719H,01D54H,00E1BH
0301    DW  02A4EH,01F70H,00F3FH,06015H,01A48H,04406H,01D7EH,01449H
0302    DW  0312CH,01204H,0586BH,01830H,0225DH,04111H,07946H,0050CH
0303    DW  02A4DH,07714H,0316BH,05E1CH,01C4AH,0680EH,02246H,00C0FH
0304    DW  03B4CH,0720AH,07558H,0340DH,04D7DH,00944H,0570BH,03E57H
0305    DW  0702CH,00674H,06C45H,00F00H,0723DH,03A07H,05544H,07803H
```

```
0306    DW   0634EH,05307H,00668H,0273FH,03626H,05706H,04761H,00823H
0307    DW   00A75H,0202EH,04B70H,0603AH,05D63H,0221EH,03D5EH,00212H
0308
0309    SCRAT:                        ;SCRATCH SPACE
0310    IIXWRD:                       ;USE FOR INDEX WORD BUILDING IN DRIVER
0311         DS    50                 ;PADD TO FILL TO MULTIPLE OF 128 BYTES
0312                                  ;WHICH IS THE CP/M RECORD SIZE
0313         DB    '==='              ;MARKS END OF LOAD
0314    TABEND:                       ;
0315         END
```

What is claimed is:

1. In an information processing system, a method for decompressing context compressed textual information, comprising the steps of:
   reading in succession each code character of a compressed text,
   reading, for each said code character, an associated context from a known decompressed portion of said text,
   selecting, for each said code character and associated context, a corresponding text character, and
   providing said text characters to comprise said text in decompressed form.

2. The method of claim 1, wherein each said context comprises:
   a group of text characters associated with said text character.

3. The method of claim 2, wherein each said context containes a fixed number of said text characters.

4. The method of claim 1, further comprising the initial step of generating a table relating said text and code characters and said contexts, comprising the steps of:
   reading each said text character and associated context of a representative sample of text,
   for each said context occuring in said sample text, generating a relative alphabet comprising said text characters occurring in association with said each said context, and
   associating a corresponding code character with each said text character of each said relative alphabet.

5. The method of claim 4, wherein:
   each of said code characters are selected from a set of code characters shared by said relative alphabets.

6. In an information processing system, a method for compressing textual information, comprising the steps of:
   generating, for each text character and associated context of a sample text, a table relating each said text character to a corresponding code character, including the steps of
   reading each said character and associated context of a representative sample of text,
   generating, for each said context occurring in said sample text, a relative alphabet comprising said text characters occurring in association with said each said context, and
   associating a corresponding code character with each said text character of said relative alphabet, and
   compressing said textual information of a text by the steps of
   reading in succession each character and an associated context of said text,
   selecting, for each said text character and associated context, a corresponding code character, and
   providing said code characters to comprise said text in compressed form.

7. The method of claim 6, wherein each said context comprises:
   a group of text characters associated with said text character.

8. The method of claim 7, wherein each said context contains a fixed number of said text characters.

9. The method of claim 6, wherein:
   each of said code characters are selected from a set of code characters shared by said relative alphabets.

10. In an information processing system, a method for compressing textual information, comprising the steps of:
    reading each text character and associated context of a representative sample of text,
    generating, for each said context occuring in said sample text, a relative alphabet comprising said text characters occuring in association with said each said context, and
    associating a corresponding code character with each said text character of each said relative alphabet,
    reading in succession each character and an associated context of a text,
    selecting, for each said text character and associated context, a corresponding code character, and
    providing said code characters to comprise said text in compressed form.

11. In an information processing system, a method for decompressing context compressed textual information, comprising the steps of:
    reading each said text character and associated context of a representative sample of text,
    generating, for each said context occuring in said sample text, a relative alphabet comprising said text characters occuring in association with said each said context, and
    associating a corresponding code character with each said text character of each said relative alphabet,
    reading in succession each code character of a compressed text,
    reading, for each said code character, an associated context from a known decompressed portion of said text,
    selecting a corresponding text character for each said code character and associated context, and
    providing said text characters to comprise said text in decompressed form.

12. In an information processing system, a method for storing and retrieving textual information, comprising the steps of:
    reading in succession each character and an associated context of a text,
    selecting, for each said text character and associated context, a corresponding code character, and
    storing said code characters to comprise said text in compressed form,
reading in succession each code character of said stored compressed text,
reading, for each said code character, an associated context from a known decompressed portion of said text,
selecting a corresponding text character for each said code character and associated context, and
providing said text characters to comprise said text in decompressed form.

13. In an information processing system, a method for communicating textual information, comprising the steps of:
reading in succession each character and an associated context of a text,
selecting, for each said text character and associated context, a corresponding code character, said code characters comprising said text in compressed form, and
communicating said code characters,
reading in succession each said communicated code character,
reading, for each said code character, an associated context from a known decompressed portion of said text,
selecting a corresponding text character for each said code character and associated context, and
providing said text characters to comprise said text in decompressed form.

14. In an information processing system, means for decompressing context compressed textual information, comprising:
means for reading in succession each code character of a compressed text,
means responsive to said code character reading means for reading, for each said code character, an associated context from a known decompressed portion of said text,
means responsive to said code character and context reading means for selecting, for each said code character and associated context, a corresponding text character and providing said text characters to comprise said text in decompressed form.

15. The decompressing means of claim 14, wherein each said context comprises:
a group of text characters associated with said text character.

16. The decompressing means of claim 15, wherein each said context containes a fixed number of said text characters.

17. The decompressing means of claim 14, further comprising:
means for storing a table relating said text and code characters and said contexts and responsive to said selecting means for providing said corresponding text characters,
said table including, for each context of the language of said text, an associated relative alphabet containing said text characters occurring in association with said contexts of said language, and wherein
each of said text characters of each of said relative alphabets is associated with a said corresponding code character.

18. The decompressing means of claim 17, wherein:
each of said code characters are selected from a set of code characters shared by said relative alphabets.

19. In an information processing system, means for compressing textual information, comprising:
means for storing a table relating text characters and associated contexts of a text with corresponding code characters,
said table including, for each context of the language of said text, an associated relative alphabet containing said text characters occurring in association with said contexts of said language, and wherein
each of said text characters of each of said relative alphabets is associated with a said corresponding code character,
means for reading in succession each character and an associated context of a text, and
means responsive to said reading means for selecting and reading from said table, for each said text character and associated context, a corresponding code character and providing said code characters to comprise said text in compressed form.

20. The compressing means of claim 19, wherein:
each of said code characters are selected from a set of code characters shared by said relative alphabets.

21. The compressing means of claim 19, wherein each said context comprises:
a group of text characters associated with said text character.

22. The compressing means of claim 21, wherein each said context containes a fixed number of said text characters.

23. In an information processing system, means for storing and retrieving textual information, comprising:
compressing means comprising
means for reading in succession each character and an associated context of a text, and
means responsive to said reading means for selecting for each said text character and associated context a corresponding code character,
means for storing said code characters to comprise said text in compressed form, and
decompressing means comprising
means for reading in succession from said storing means each code character of said compressed text,
means responsive to said code character reading means for reading, for each said code character, an associated context from a known decompressed portion of said text, and
means responsive to said code character and context reading means for selecting, for each said code character and associated context, a corresponding text character and providing said text characters to comprise said text in decompressed form.

24. The storing and retrieving means of claim 23, further comprising:
means for storing a table relating said text and code characters and said contexts and responsive to said code and text character selecting means for providing said corresponding code and text characters,
said table including, for each context of the language of said text, an associated relative alphabet containing said text characters occurring in association with said contexts of said language, and wherein
each of said text characters of each of said relative alphabets is associated with a said corresponding code character.

25. In an information processing system, means for communicating textual information, comprising:
means for compressing a text, comprising means for reading in succession each character and an associated context of a text, and means responsive to said reading means for selecting for each said text character and associated context a corresponding code character, said code characters comprising said text in compressed form, means for communicating said code characters, and means for decompressing said compressed text, comprising means for reading in succession each said communicated code character, means responsive to said code character reading means for reading, for each said code character, an associated context from a known decompressed portion of said text, and means responsive to said code character and context reading means for selecting, for each said code character and associated context, a corresponding text character and providing said text characters to comprise said text in decompressed form.

26. The communicating means of claim 25, wherein: said compressing means further comprises means for storing a table relating said text and code characters and said contexts and responsive to said code character selecting means for providing said corresponding code characters, said table including, for each context of the language of said text, an associated relative alphabet containing said text characters occurring in association with said contexts of said language, and wherein each of said text characters of each of said relative alphabets is associated with a said corresponding code character, and said decompressing means further comprises means for storing a table relating said text and code characters and said contexts and responsive to said text character selecting means for providing said corresponding text characters, said table including, for each context of the language of said text, an associated relative alphabet containing said text characters occurring in association with said contexts of said language, and wherein each of said text characters of each of said relative alphabets is associated with a said corresponding code character.

* * * * *